(12) United States Patent
Fukaya et al.

(10) Patent No.: US 7,298,395 B2
(45) Date of Patent: Nov. 20, 2007

(54) ANGULAR POSITION SENSOR WORKING TO MEASURE HIGH LINEARITY MAGNETIC FLUX DENSITY

(75) Inventors: Shigetoshi Fukaya, Toyota (JP); Kenji Takeda, Okazaki (JP); Naoki Nakane, Toyota (JP); Tetsuo Imamura, Toyoake (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 865 days.

(21) Appl. No.: 10/755,682

(22) Filed: Jan. 13, 2004

(65) Prior Publication Data

US 2004/0164733 A1    Aug. 26, 2004

(30) Foreign Application Priority Data

Jan. 14, 2003  (JP) ............................... 2003-006349
Jun. 27, 2003  (JP) ............................... 2003-185019

(51) Int. Cl.
*H04N 7/18* (2006.01)
(52) U.S. Cl. ................. 348/149; 348/61; 348/169
(58) Field of Classification Search ................ 348/149, 348/143, 169, 61
See application file for complete search history.

(56) References Cited

U.S. PATENT DOCUMENTS 4,966,041 A    10/1990   Miyazaki 5,528,139 A    6/1996   Oudet et al.
5,963,248 A *  10/1999   Ohkawa et al. ............. 348/169

FOREIGN PATENT DOCUMENTS

| DE | 41 09 658 A1 | 3/1991 |
|---|---|---|
| DE | 197 16 985 A1 | 10/1998 |
| DE | 101 43 286 A1 | 4/2002 |
| EP | 0 859 213 A1 | 8/1998 |
| EP | 1 065 473 A2 | 1/2001 |
| JP | 53-149357 | 12/1978 |
| JP | 57-67820 | 4/1982 |
| JP | 2842482 | 10/1998 |
| WO | WO 00/04339 | 1/2000 |

\* cited by examiner

*Primary Examiner*—Allen Wong
(74) *Attorney, Agent, or Firm*—Posz Law Group, PLC

(57) ABSTRACT

An angular position sensor is provided which is designed to an angular position of a rotary shaft. The angular position sensor has a magnet affixed to the rotary shaft. The magnet has an N-pole and an S-pole and is so geometrically shaped as to produce magnetic flux which is substantially uniform in amount within a range extending around each of centers of the N-pole and the S-pole. This improves the linearity of a change in sensor output upon rotation of the rotary shaft.

20 Claims, 20 Drawing Sheets

(I) 0 [deg]

(II) 90 [deg]

(III) 180 [deg]

ANGULAR POSITION SENSOR WORKING TO MEASURE HIGH LINEARITY MAGNETIC FLUX DENSITY

BACKGROUND OF THE INVENTION

1. Technical Field of the Invention

The present invention relates generally to an angular position sensor working to measure an angular position of a rotary member, and more particularly to an improved structure of such an angular position sensor designed to sense a magnetic flux density that is higher in linearity.

2. Background Art

Typical angular position sensors working to measure an angular position of a rotary shaft are made up of a ring-shaped magnet with an N-pole and an S-pole arrayed in a circumferential direction thereof, a magnetic yoke disposed around the periphery of the magnet, and magnetic sensors. The magnetic yoke has formed therein radial grooves forming air gaps. The magnetic sensors are disposed within the air gaps and work to measure magnetic flux densities in the air gaps. For instance, U.S. Pat. No. 5,528,139 to Oudet et al., issued Jun. 18, 1996 (corresponding to Japanese Patent No. 2842482) teaches such a type of angular position sensor.

The N-pole and the S-pole of the magnet are disposed at an angular interval of 180° and create a magnetic flux density changing at a constant rate in the circumferential direction of the magnet. This causes the magnetic flux density as measured by the magnetic sensors to change in the form of a sine wave upon rotation of the rotary shaft. It is, thus, impossible for the magnetic sensors to measure the magnetic flux density that is higher in linearity. Determination of an absolute angular position of the rotary shaft requires large-scaled operations on trigonometric functions and/or using a map, thus posing the problem that the operation load on the system is undesirably high.

SUMMARY OF THE INVENTION

It is therefore a principal object of the invention to avoid the disadvantages of the prior art.

It is another object of the invention to provide an angular position sensor designed to measure a magnetic flux density that is higher in linearity.

According to one aspect of the invention, there is provided an angular position sensor which may be employed in electric power steering devices for automotive vehicles. The angular position sensor comprises: (a) a hard magnetic member connected to a rotary member, the hard magnetic member having a circumference and magnetized in a circumferential direction thereof to produce a magnetic field therearound; (b) a soft magnetic member disposed within the magnetic field produced by the hard magnetic member to form a magnetic circuit, rotation of the rotary member to change a relative position between the magnetic field and the hard magnetic member causes a magnetic flux density in the magnetic circuit to change; and (c) a magnetic flux density measuring sensor disposed at an interval away from the soft magnetic member. The magnetic flux density measuring sensor works to measure the magnetic flux density in the magnetic circuit to produce a signal as a function of the magnetic flux density as indicating an angular position of the rotary member. The hard magnetic member is so designed as to create magnetic flux that is substantially uniform in amount within a given angular range in a circumferential direction thereof, thereby causing the density of magnetic flux developed in the magnetic circuit to change substantially in proportion to a change in angular position of the rotary member, which enables the angular position sensor to provide a change in output that is higher in linearity upon rotation of the rotary member.

In the preferred mode of the invention, the hard magnetic member has a first magnetic pole and a second magnetic pole which are different in polarity from each other and joined at ends thereof together to define the circumference of the hard magnetic member. The first and second magnetic poles work to create the magnetic flux that is substantially uniform in amount within angular ranges defined around central portions of the first and second magnetic poles in the circumferential direction of the hard magnetic member. This structure provides a change in amount of the magnetic flux produced upon rotation of the rotary member in the form of substantially a rectangular wave within the angular range around the central portion of each of the first and second magnetic poles.

The central portions of the first and second magnetic poles may have a thickness defined in a direction perpendicular to a plane extending over the circumference of the hard magnetic member which is smaller than a thickness of portions of the first and second magnetic poles around interfaces between ends of the first and second magnetic poles. Specifically, the central portions of the first and second magnetic poles are thinner, in other words, peripheral areas of the first and second magnetic poles are smaller than those of the portions around the interfaces between the ends of the first and second magnetic poles, so that a total amount of magnetic flux produced from the central portions are decreased as compared with when the first and second magnetic poles have the thickness that is uniform over the circumference of the hard magnetic member, thereby resulting in the uniformity of the amount of magnetic flux within the angular ranges defined around the central portions of the first and second magnetic poles.

The central portions of the first and second magnetic poles may alternatively have a width defined in a direction oriented parallel to a plane extending cover the circumference of the hard magnetic member which is smaller than a width of the portions of the first and second magnetic poles around the interfaces between ends of the first and second magnetic poles. Specifically, the peripheral areas of the first and second magnetic poles are smaller than those of the portions around the interfaces between the ends of the first and second magnetic poles, so that a total amount of magnetic flux produced from the central portions are decreased as compared with when the first and second magnetic poles have the width that is uniform over the circumference of the hard magnetic member, thereby resulting in the uniformity of the amount of magnetic flux within the angular ranges defined around the central portions of the first and second magnetic poles.

The hard magnetic member may alternatively have sub-soft magnetic members which work to convert magnetic flux generated from the first and second magnetic poles into the magnetic flux that is substantially uniform in amount within the given angular range. The sub-soft magnetic members are disposed on outer peripheries of the central portions of the first and second magnetic poles.

In the structure wherein the hard magnetic member has the thickness defined in the direction perpendicular to a plane extending over the circumference thereof which is smaller than that of the soft magnetic member, the hard magnetic member and the soft magnetic member may be so disposed that a plane defined on a circumferential center line of the hard magnetic member in a thickness-wise direction thereof coincides with a plane defined on a circumferential center line of the soft magnetic member in a thickness-wise direction thereof. This structure serves to keep the hard magnetic member inside the soft magnetic member in a thickness-wise direction of the hard magnetic member even if a slight shift between the hard magnetic member and the soft magnetic member occurs in the thickness-wise direction of the hard magnetic member, thereby minimizing a change in magnetic flux density to be measured by the magnetic flux density measuring sensor.

The angular position sensor may further comprise a magnetic shield which surrounds the soft magnetic member to minimize an error of a sensor output arising from external magnetic disturbances.

The soft magnetic member may have a circumference and be disposed outside the circumference of the hard magnetic member. The soft magnetic member may have a first, a second, a third, and a fourth gap formed therein at an interval of approximately 90° in a circumferential direction of the soft magnetic member. A distance between an outer periphery of the soft magnetic member and the magnetic shield is greater than a length of each of the first to fourth gaps in the circumferential direction of the soft magnetic member, thereby avoiding leakage of the magnetic flux from the soft magnetic member to the magnetic shield.

The widths of the first and second magnetic poles of the hard magnetic member defined in the direction perpendicular to the plane extending over the circumferential direction of the hard magnetic member may decrease toward circumferential centers of the first and second magnetic poles. Specifically, the peripheral areas around the circumferential centers of the first and second magnetic poles are smaller than those of the portions around the interfaces between the ends of the first and second magnetic poles, so that a total amount of magnetic flux produced from the central portions are decreased as compared with when the first and second magnetic poles have the width that is uniform over the circumference of the hard magnetic member, thereby resulting in the uniformity of the amount of magnetic flux within the angular ranges defined around the central portions of the first and second magnetic poles.

Each of the hard magnetic member and the soft magnetic member may have a circular inner circumference. The hard magnetic member may have substantially circular outer circumference defined by geometry that widths of the circumferential centers of the first and second magnetic poles in the direction perpendicular to the circumferential direction of the hard magnetic member are smaller than widths of interfaces between the first and second magnetic poles.

In the structure wherein the thickness of the hard magnetic member in the direction perpendicular to the plane extending over the circumference of the hard magnetic member is greater than that of the soft magnetic member, ends of the hard magnetic member opposed in the direction perpendicular to the plane extending over the circumference of the hard magnetic member may project outside ends of the soft magnetic member in the direction perpendicular to the circumference of the hard magnetic member. This causes the magnetic flux to flow from corners of the hard magnetic member out of the soft magnetic member which serves to attract incoming iron powders to avoid sticking thereof to the inner periphery of the soft magnetic member and an opposed portion of the outer periphery of the hard magnetic member, thus ensuring the stability of flow of magnetic flux from the hard magnetic member to the inner periphery of the soft magnetic member for an extended period of time.

According to the second aspect of the invention, there is provided an angular position determining apparatus which comprises: (A) an angular position sensor including (a) a hard magnetic member connected to a rotary member, the hard magnetic member having a circumference and magnetized in a circumferential direction thereof to produce a magnetic field therearound and working to produce magnetic flux that is substantially uniform in amount within a given angular range in a circumferential direction thereof, the hard magnetic member having a first magnetic pole and a second magnetic pole different in polarity from the first magnetic pole, the first and second magnetic poles being jointed at ends thereof at locations 180° apart from each other in a circumferential direction of the hard magnetic member, (b) a soft magnetic member disposed outside the circumference of the hard magnetic member within the magnetic field produced by the hard magnetic member to form a magnetic circuit, rotation of the rotary member to change a relative position between the magnetic field and the hard magnetic member causes a magnetic flux density in the magnetic circuit to change, the soft magnetic member having gaps formed therein at an interval of approximately 90°, and (c) a magnetic flux density measuring sensor including a first and a second sensor element respectively disposed in two of the gaps adjacent in the circumferential direction of the soft magnetic member, the first and second sensor elements working to measure magnetic flux densities within the two gaps and produce electric signals indicative thereof; and (B) an angular position computing circuit working to computing an angular position of the rotary member based on the electric signals produced by the magnetic flux density measuring sensor. Specifically, the densities of magnetic flux produced in the gaps are 90° out of phase with each other, so that outputs of the first and second sensor elements will also be 90° out of phase with each other, thereby enabling the angular position computing circuit to determine the angular position of the rotary member in a full angular range.

The angular position computing circuit is designed to combine the electric signals to determine the angular position of the rotary member within the full angular range.

The angular position computing circuit is designed to perform at least one of addition, subtraction, multiplication, and division operations on the electric signals provided by the magnetic flux density measuring sensor, thus resulting in a decrease in operation load on the angular position computing circuit.

The rotary member may be a steering shaft connected to a steering wheel of an automotive vehicle.

According to the third aspect of the invention, there is provided an angular position determining apparatus which comprises: (a) a ring-shaped hard magnetic member connected to a rotary member, the hard magnetic member including a first magnetic pole and a second magnetic pole different in polarity from the first magnetic pole, the first and second magnetic poles being jointed at ends thereof at locations 180° apart from each other in a circumferential direction of the hard magnetic member, the hard magnetic member being so designed as to create magnetic flux that is substantially uniform in amount within a given angular range in a circumferential direction thereof; (b) a soft magnetic member disposed outside a circumference of the hard magnetic member having formed therein gaps arrayed at an interval of approximately 90°, rotation of the rotary member to change a relative position between the hard magnetic member and the soft magnetic member causes a magnetic flux density in the gaps to change; (c) magnetic flux density measuring sensors disposed one in each of two of the gaps adjacent in a direction of array of the gaps, the magnetic flux density measuring sensors working to magnetic flux densities within the two gaps and produce electric signals indicative thereof which exhibit substantially triangular waves shifted 90° apart in phase from each other and each of which has a straight portion; and (d) an angular position computing circuit working to combine and correct the straight portions of the triangular waves to form a substantially single straight line. The angular position computing circuit computes an angular position of the rotary member using the straight line. This structure serves to provide outputs of the magnetic density measuring sensors which are higher in linearity as a function of a change in angular position of the rotary member. The above combination and correction minimizes an error in determining the angular position of the rotary member.

The electric signals produced by the magnetic flux density measuring sensors are voltage signals whose level change as a function of the angular position of the rotary member. The correction of the straight portions of the triangular waves is achieved in the angular position computing circuit by extracting segments from the straight portions each of which extends over one of preselected angular ranges of rotation of the rotary member, bringing signs of inclinations of the segments into agreement with each other, moving the segments in parallel to bring a voltage level of an end of each of the segments into agreement with that of an end of an adjacent one of the segments, and joining the moved segments to produce a single voltage-to-angle line, defining a straight voltage-to-angle line extending between a maximum voltage level and a minimum voltage level indicated by the single voltage-to-angle line, determining a middle voltage level intermediate between the straight voltage-to-angle line, determining a voltage correction value required to bring the middle voltage level into agreement with an ideal one, and determining an inclination correction value required to bring an inclination of the straight voltage-to-angle line into agreement with an ideal one.

Each of the magnetic flux density measuring sensors may be designed to correct the electric signal so as to compensate for an error arising from an ambient temperature.

Each of the magnetic flux density measuring sensors may be equipped with a temperature-to-correction value map. Each of the magnetic flux density measuring sensors works to pick up a correction value from the temperature-to-correction value map which corresponds to the ambient temperature and correct the electric signal using the correction value.

The angular position computing circuit may store therein an ideal maximum voltage level and an ideal minimum voltage level of the electric signals, determine a first difference between an actual maximum voltage level of the electric signals and the ideal maximum voltage level and a second difference between an actual minimum voltage level and the ideal minimum voltage level, and correct the actual maximum and minimum voltage levels using the first and second differences. Usually, the amount of magnetic flux produced by the hard magnetic, member decreases gradually with a rise in ambient temperature, thus resulting in a decrease in magnetic flux density to be measured by the magnetic flux density measuring sensors. This will cause the voltage levels of outputs of the magnetic flux density measuring sensors to drop. In order to eliminate this problem, the angular position computing circuit is designed to compensate for the drops in voltage levels of the outputs from the magnetic flux density measuring sensors in the above manner.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1A:
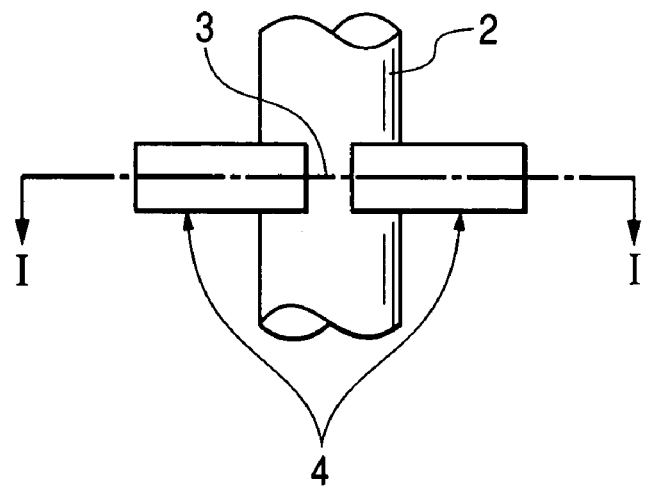
FIG. 1(a) is a side view which shows an angular position sensor according to the first embodiment of the invention.
Figure 1B:
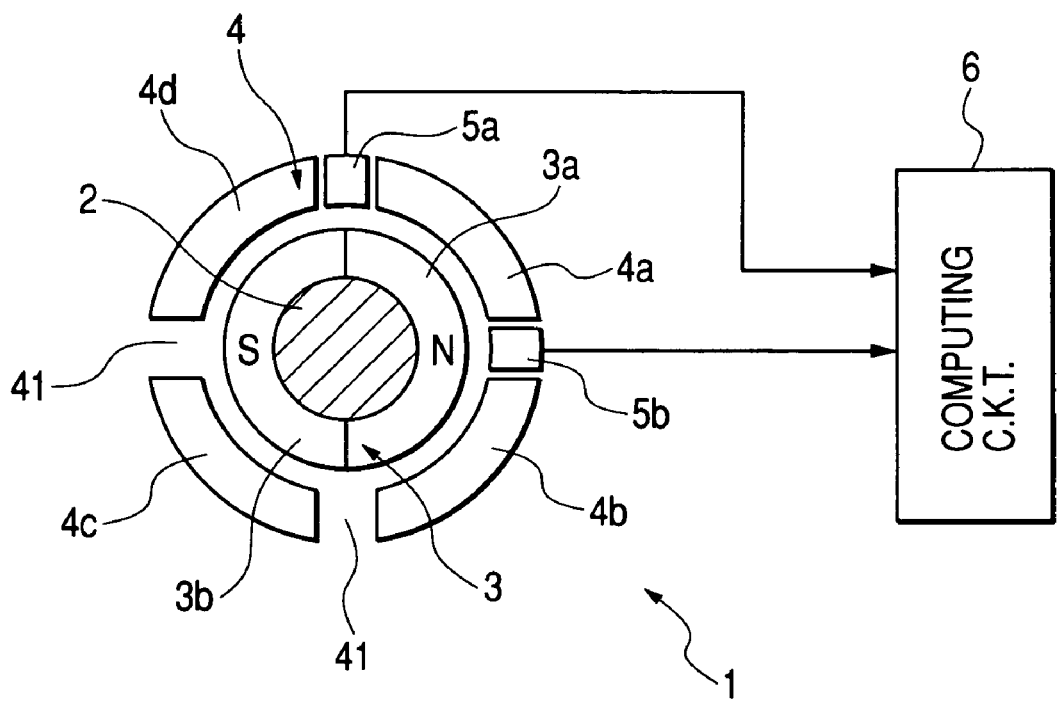
FIG. 1(b) is a transverse sectional view, as taken along the line I-I in FIG. 1(a), which shows an angular position detector of the first embodiment.

Referring to the drawings, wherein like reference numbers refer to like parts in several views, particularly to FIGS. 1(a) and 1(b), there is shown an angular position detector 1 according to the first embodiment of the invention.

The angular position detector 1 consists essentially of an angular position sensor installed on an outer periphery of a rotary shaft 2 and an angular position computing circuit 6.

The angular position computing circuit 6 is designed to determine an angular position of the rotary shaft 2 using an output of the angular position sensor.

The angular position sensor includes a magnet 3 made of a hard magnetic material, a yoke 4 made of a soft magnetic material, and a magnetic sensor 5 working to measure the density of magnetic flux.

Figure 2:
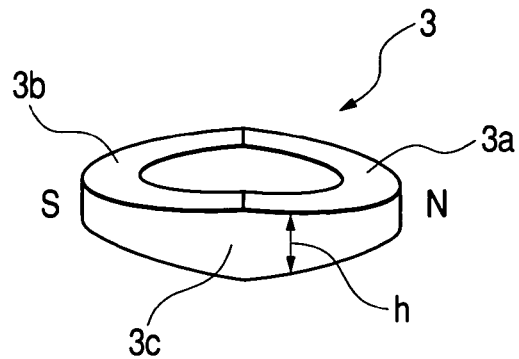
FIG. 2 is a perspective view which shows a magnet of the angular position sensor of FIGS. 1(a) and 1(b)

The magnet 3 is of a ring-shape and affixed to the outer periphery of the rotary shaft 2. The magnet 3 is made up of two semicircular parts: one having an N-pole 3a, and the other having an S-pole 3b. The N-pole 3a and the S-pole 3b are joined integrally at ends thereof at locations 180° far away from each other. The magnet 3 has a thickness h, as shown in FIG. 2, which decreases gradually from interfaces 3c between the N-pole 3a and the S-pole 3b to circumferential centers of the N-pole 3a and the S-pole 3b.

The yoke 4 is of an annular shape and made up of four segments 4a to 4b (will also be referred to as a first, a second, a third, and a fourth yoke segment below) which are arrayed in a circle around the periphery of the magnet 3 through air gaps 41 located at approximately 90° away from each other. The yoke 4 has a thickness, as shown in FIG. 1(a), greater than that of the magnet 3. The circumferential center line of the yoke 4 (i.e., a line extending through the middle of the thickness of the yoke 4) coincides with that of the magnet 3 over the entire circumference thereof. In other words, the magnet 3 and the yoke 4 are so disposed that a plane defined on the circumferential center line of the magnet 3 in a thickness-wise direction thereof coincides with that defined on the circumferential center line of the yoke 4 in a thickness-wise direction thereof.

The magnetic sensor 5 is made up of a first sensor element 5a and a second sensor element 5b. The first sensor element 5a is disposed within the gap 41 between the first and fourth yoke segments 4a and 4b. The second sensor element 5b is disposed within the gap 41 between the first and second yoke segments 4a and 4b. The first and second elements 5a and 5b work to measure magnetic flux developed in the gaps 41 as indicating the density of magnetic flux, respectively. The first and second sensor elements 5a and 5b are separate from the yoke 4 and each implemented by, for example, a Hall sensor, a Hall IC, or a magneto-resistive device which works to output an electric signal (e.g., a voltage signal) as a function of the density of magnetic flux within the gap 41 to the angular position computing circuit 6.

The angular position computing circuit 6 works to determine an angular position (i.e., an absolute angle) of the rotary shaft 2 using the electric signals outputted from the first and second sensor elements 5a and 5b. Specifically, the angular position computing circuit 6 combines or links the outputs of the first and second sensor elements 5a and 5b together to determine the angular position of the rotary shaft 2 over 90°.

The density of magnetic flux generated by the magnet 3 will be described below.

Figure 3A:
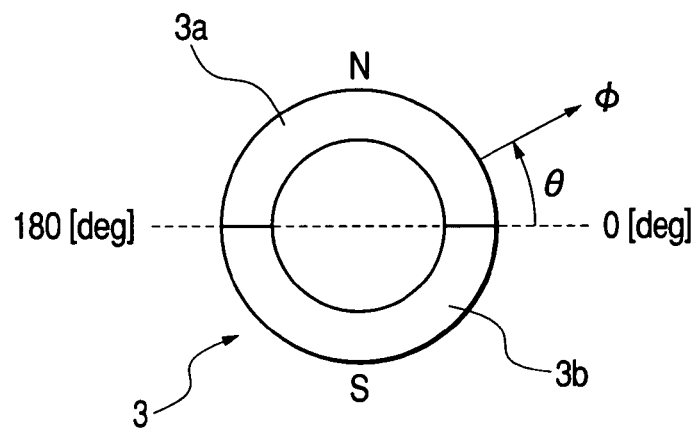
FIG. 3(a) is a plane view which shows orientation of magnetic flux flowing out of the magnet of FIG. 2.

The thickness h of the magnet 3, as described above, decreases from the interfaces 3c between the ends of the N-pole 3a and the ends of the S-pole 3b to the circumferential centers thereof, so that the thickness of the circumferential centers of the N-pole 3a and the S-pole 3b is smaller than that of the interfaces 3c. Specifically, an area of a peripheral surface around the circumferential centers of the N-pole 3a and the S-pole 3b of the magnet 3 is smaller than that when the thickness h is constant over the entire circumference of the magnet. In other words, the amount of magnetic flux produced in the radius direction of the magnet 3 from the circumferential centers of the N-pole 3a and the S-pole 3*b* which are the greatest in magnetic flux density is decreased. This causes a total amount of magnetic flux to be almost uniform around the circumferential centers of the N-pole 3*a* and the S-pole 3*b* of the magnet 3. Rotation of the magnet 3 (i.e., the rotary shaft 2) will cause the amount of magnetic flux flowing through each of the sensor elements 5*a* and 5*b* of the magnetic sensor 5 to change cyclically in the form of a wave, as shown in FIG. 3(*b*). The amount of magnetic flux within a range X (i.e., around the circumferential center of the N-pole 3*a*) is substantially identical with that within a range Y (around the circumferential center of the N-pole 3*b*).

A decrease in thickness h of the magnet 3 from the interfaces 3*c* between the N-pole 3*a* and the S-pole 3*b* is so selected that the amount of magnetic flux created from around each of the circumferential centers of the N-pole 3*a* and the S-pole 3*b* is substantially constant.

A change in magnetic flux density as measured by the magnetic sensor 5 when the rotary shaft 2 rotates in a circumferential direction thereof will be described below with reference to FIGS. 4(*a*) to 4(*d*).

When the rotary shaft 2 is, as shown in FIG. 4(*a*), at an angular position I of zero (0°), no magnetic flux flows through the gap 41 between the first and fourth yoke segments 4*a* and 4*b*, so that the magnetic flux density shows zero (0), while a maximum magnetic flux density of a negative polarity is developed in the gap 41 between the first and second yoke segments 4*a* and 4*b*. The first and second sensor elements 5*a* and 5*b* output voltage signals having levels on a broken line I, as illustrated in FIG. 4(*d*).

When the rotary shaft 2 rotates 90° in a clockwise direction from the angular position I to an angular position II, as shown in FIG. 4(*b*), it causes a maximum magnetic flux density of a positive polarity to be developed in the gap 41 between the first and fourth yoke segments 4*a* and 4*d*, while no magnetic flux flows through the gap 41 between the first and second yoke segments 4*a* and 4*b*. The first and second sensor elements 5*a* and 5*b* output voltage signals having levels on a broken line II, as illustrated in FIG. 4(*d*).

When the rotary shaft 2 further rotates 90° in the clockwise direction from the angular position II to an angular position III, as shown in FIG. 4(*c*), it causes a maximum magnetic flux density of the positive polarity to be developed in the gap 41 between the first and second yoke segments 4*a* and 4*b*. The first and second sensor elements 5*a* and 5*b* output voltage signals having levels on a broken line III, as illustrated in FIG. 4(*d*).

The amount of magnetic flux flowing from around each of the circumferential centers of the N-pole 3*a* and the S-pole 3*b* is, as described above, substantially constant, thus causing the magnetic flux density within the gaps 41 between the first and fourth yoke segments 4*a* and 4*d* and between the first and second yoke segments 4*a* and 4*b* during rotation of the rotary shaft 2 to change at a constant rate, so that the first and second sensor elements 5*a* and 5*b* output the voltage signals, as indicated by solid lines in FIG. 4(*d*).

Figure 5:
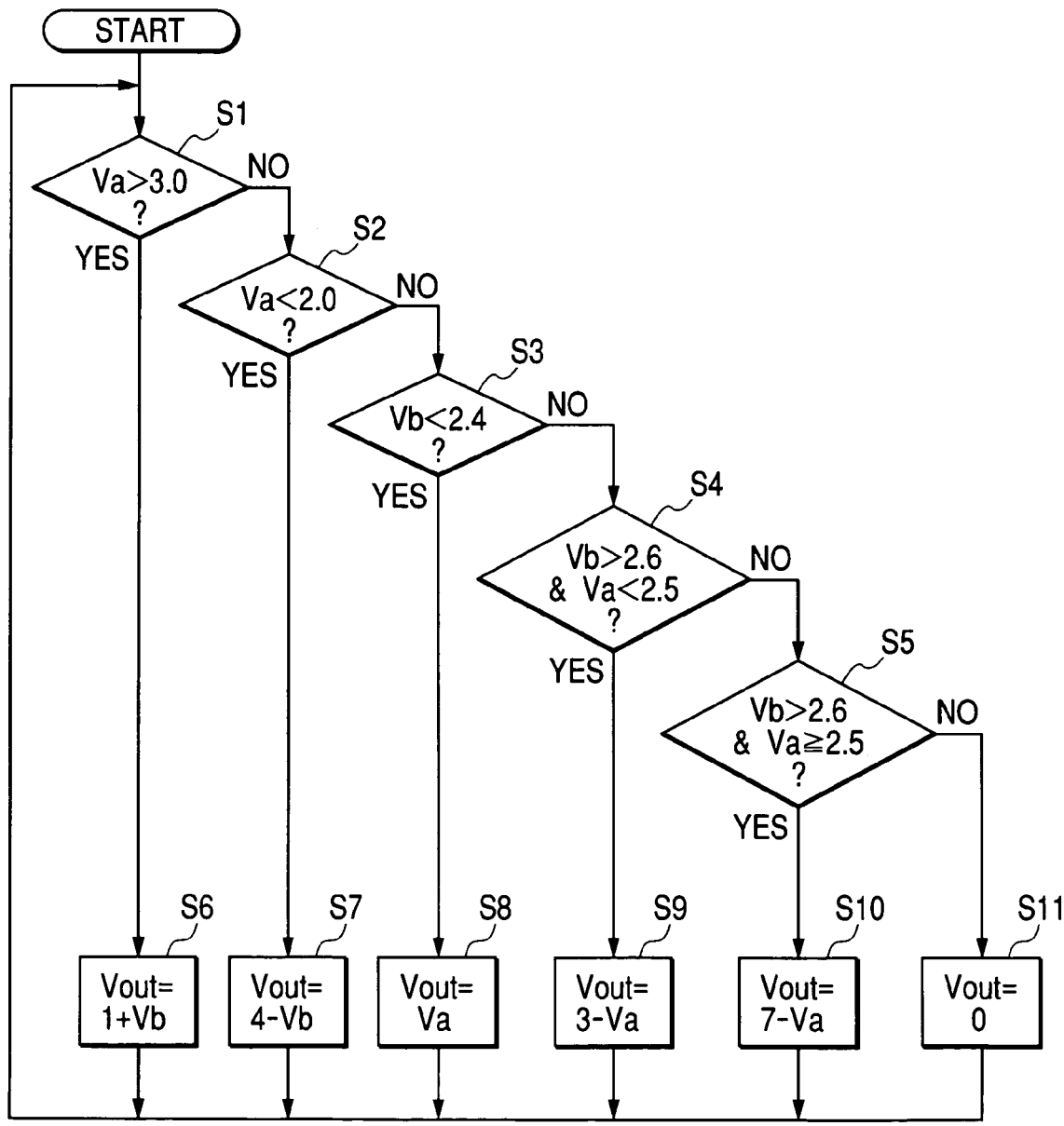
FIG. 5 is a flowchart of a program executed in an angular position computing circuit to produce an output voltage indicative of an angular position of a rotary shaft.

FIG. 5 shows a flowchart of logical steps or program executed by the angular position computing circuit 6 of the angular position detector 1. In the following discussion, voltage outputs of the first and second sensor elements 5*a* and 5*b* are indicated by Va and Vb, respectively, and an output voltage of the angular position computing circuit 6 is indicated by Vout.

After entering the program, the routine proceeds to step 1 wherein it is determined whether the voltage output Va is greater than 3.0V or not. If a YES answer is obtained (Va>3.0V), then the routine proceeds to step 6 wherein the output voltage Vout is determined according to a relation of Vout=1+Vb and returns back to step 1

Alternatively, if a NO answer is obtained (Va≦3.0V), then the routine proceeds to step 2 wherein it is determined whether the voltage output Va is smaller than 2.0V or not. If a YES answer is obtained (Va<2.0V), then the routine proceeds to step 7 wherein the output voltage Vout is determined according to a relation of Vout=4−Vb and returns back to step 1.

Alternatively, if a NO answer is obtained (Va≧2.0V), then the routine proceeds to step 3 wherein it is determined whether the voltage output Va is smaller than 2.4V or not. If a YES answer is obtained (Va<2.4V), then the routine proceeds to step 8 wherein the output voltage Vout is determined according to a relation of Vout=Va and returns back to step 1.

Alternatively, if a NO answer is obtained (Va≧2.4V), then the routine proceeds to step 4 wherein it is determined whether the output voltage Vb is greater than 2.6V, and the voltage output Va is smaller than 2.5V or not. If a YES answer is obtained (Vb>2.6V, and Va<2.5V), then the routine proceeds to step 9 wherein the output voltage Vout is determined according to a relation of Vout=3−Va and returns back to step 1.

Alternatively, if a NO answer is obtained in step 4, then the routine proceeds to step 5 wherein it is determined whether the output voltage Vb is greater than 2.6V, and the voltage output Va is greater than or equal to 2.5V or not. If a YES answer is obtained, then the routine proceeds to step 10 wherein the output voltage Vout is determined according to a relation of Vout=7−Va and returns back to step 1.

Alternatively, if a NO answer is obtained in step 5, the routine proceeds to step 11 wherein the output voltage Vout is determined according to a relation of Vout=0 and returns back to step 1.

Figure 6:
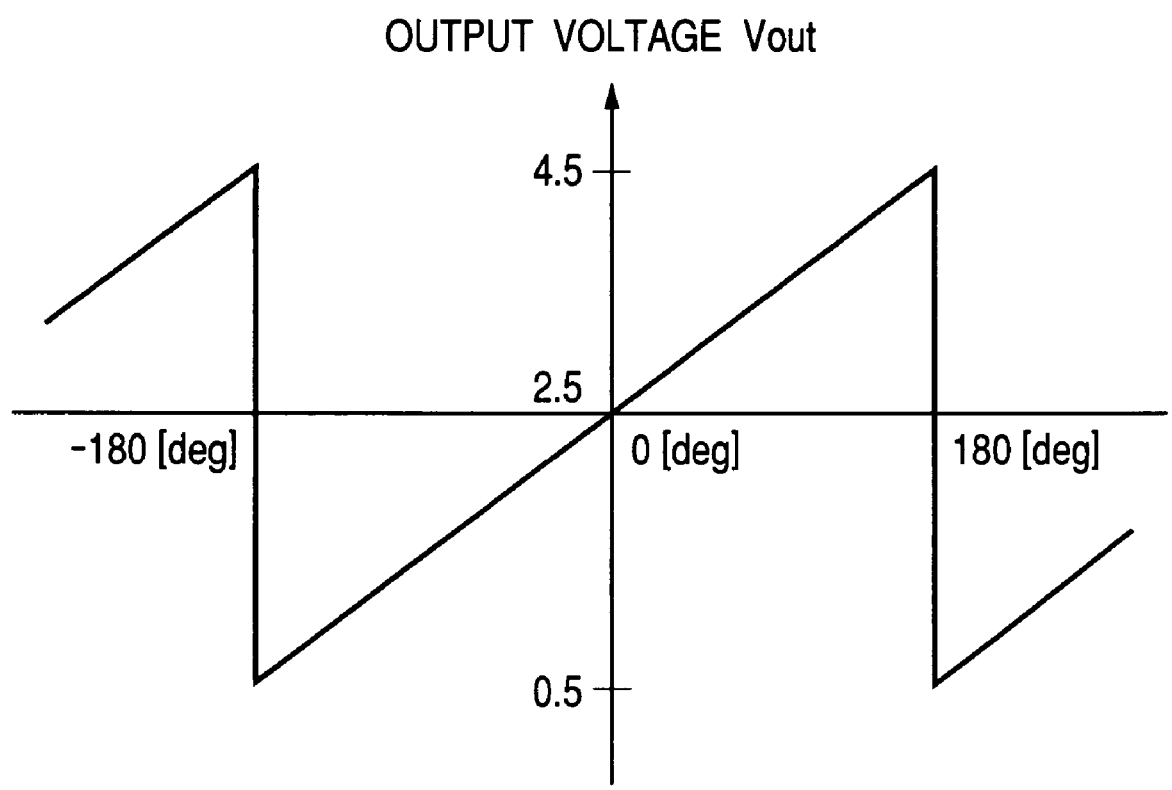
FIG. 6 is a graph which shows the output voltage as produced by the program of FIG. 5.

FIG. 6 shows the output voltage Vout of the angular position computing circuit 6, as derived in the above operations, which changes at a constant rate over a 360° angular range (i.e., −180° to +180°) of the rotary shaft 2. Specifically, the angular position computing circuit 6 works to output an absolute angular position of the rotary shaft 2 over the full angular range thereof.

The structure of the angular position detector 1 of this embodiment, as apparent from the above discussion, offers the following effects.

The thickness h of the magnet 3 is so selected as to decrease from the interfaces 3*c* between the ends of the N-pole 3*a* and the ends of the S-pole 3*b* to the circumferential centers thereof, so that the area of the peripheral surface around the circumferential center of each of the N-pole 3*a* and the S-pole 3*b* will be the smallest. This causes the density of magnetic flux flowing out of the peripheral surface around the circumferential center of each of the N-pole 3*a* and the S-pole 3*b* to be constant, so that the amount of magnetic flux within the gaps 41 during rotation of the rotary shaft 2 changes at substantially a constant rate. Specifically, each of the first and second sensor elements 5*a* and 5*b* works to output a voltage signal as a function of the magnetic flux density within the gap 41 which exhibits higher linearity.

The magnet 3 is so designed as to produce the magnetic flux in the radius direction thereof which changes, as shown in FIG. 3(*b*), in the form of a rectangular wave, thereby causing the magnetic sensor 5 to sense the magnetic flux density which changes in the form of substantially a triangle wave. This allows the angular position computing circuit 6 to determine the angular position of the rotary shaft 2 correctly using simple operations such as addition, subtraction, multiplication, or division operation or a combination thereof without performing high load operations such as trigonometric function operations.

The yoke 4 has a thickness, as shown in FIG. 1(*a*), greater than that of the magnet 3. The circumferential center line of the yoke 4 coincides with that of the magnet 3 over the entire circumference thereof. This structure allows the rotary shaft 2 to which the magnet 3 is affixed to be shifted in the lengthwise direction thereof within a range where the magnet 3 lies inside opposed end surfaces of the yoke 4 (i.e., upper and lower end surfaces, as viewed in FIG. 1 (*a*)) in the lengthwise direction of the rotary shaft 2, thereby decreasing the amount of magnetic flux leaking outside the yoke 4, that is, a change in magnetic flux density to be measured by the magnetic sensor 5.

The angular position computing circuit 6 is designed to combine electric signals outputted from the sensor elements 5*a* and 5*b* of the magnetic sensor 5, thereby enabling an angular position indicative analog signal over a range of 90° or more to be produced.

The threshold voltages employed in comparison with the output voltage of the magnetic sensor 5 in the flowchart of FIG. 5 are merely reference values and changed preferably according to the magnitude of an output of the magnetic sensor 5.

Figure 7A:
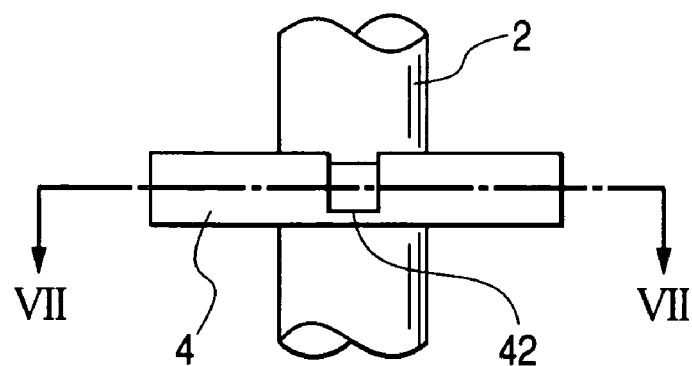
FIG. 7(a) is a side view which shows an angular position sensor according to the second embodiment of the invention.
Figure 7B:
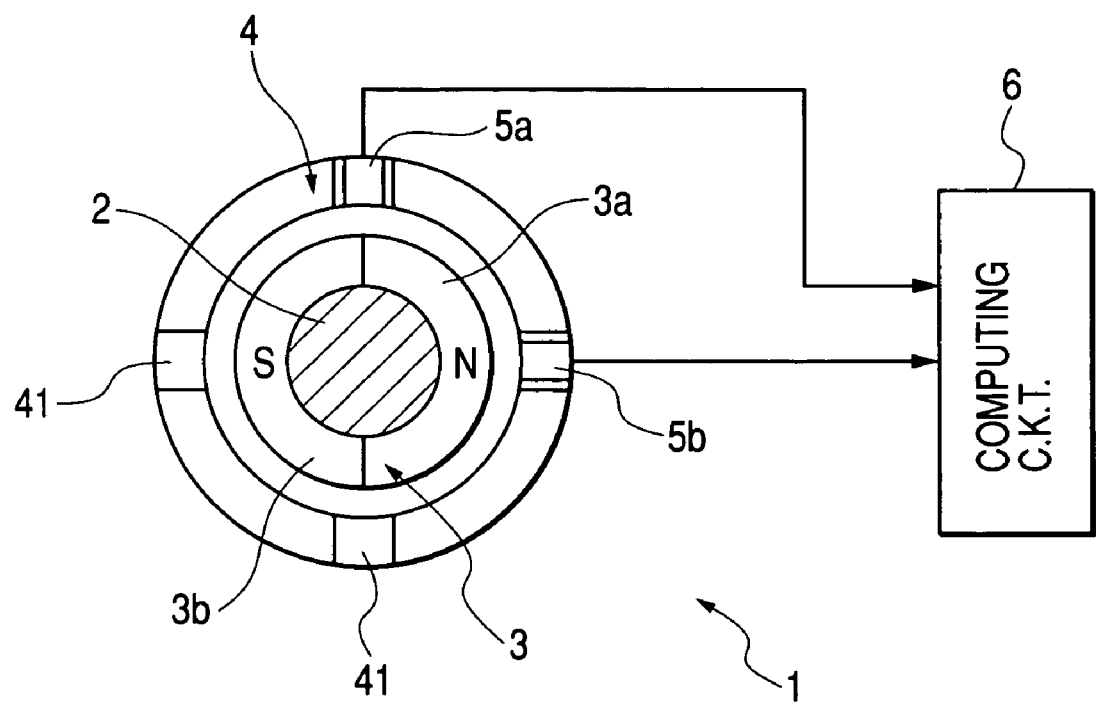
FIG. 7(b) is a transverse sectional view, as taken along the line VII-VII in FIG. 7(a), which shows an angular position detector of the second embodiment.

FIGS. 7(*a*) and 7(*b*) show the angular position detector 1 according to the second embodiment of the invention.

The yoke 4 is, unlike the first embodiment, made of a one-piece ring which have four recesses 42 formed at an angular interval of 90° in a circumferential direction thereof to create the gaps 41. The formation of the recesses 42 may be achieved by grinding.

The structure of this embodiment facilitates ease of positioning of the yoke 4 around the magnet 3 and results in a decrease in parts making up the angular position sensor.

The grinding of the yoke 4 to form the recesses 42 serves to minimize a shift in location of the gaps 41 in the circumferential direction of the yoke 4 and/or an error in dimension of the recesses 42 or the gaps 41 in the circumferential direction of the yoke 4.

Other arrangements are identical with those in the first embodiment, and explanation thereof in detail will be omitted here.

Figure 8A:
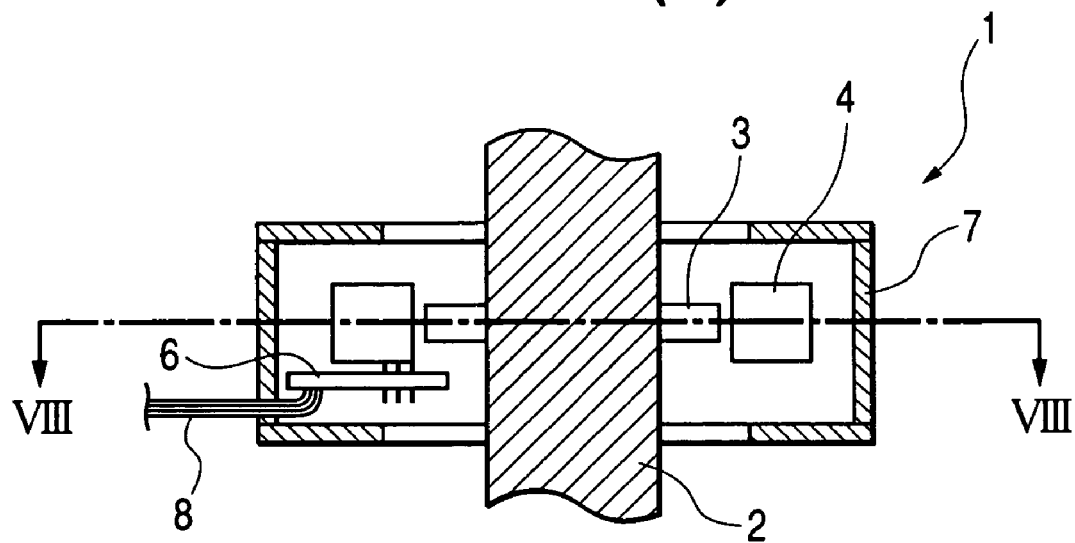
FIG. 8(a) is a sectional view, as taken along the length of a rotary shaft to which a magnet is affixed, which shows an angular position detector according to the third embodiment of the invention.
Figure 8B:
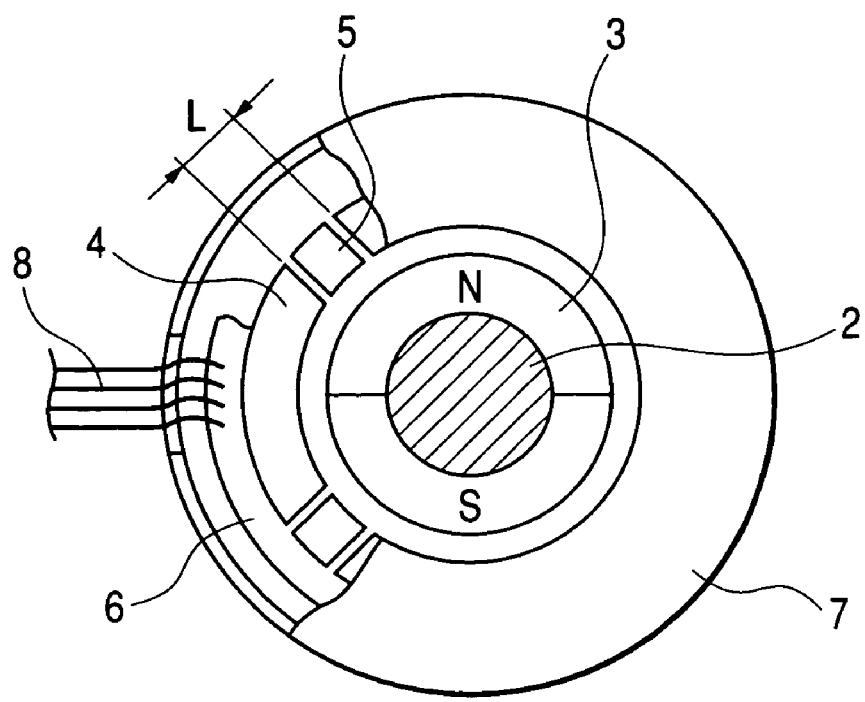
FIG. 8(b) is a transverse sectional view, as taken along the line VII-VII in FIG. 8(a)

FIGS. 8(*a*) and 8(*b*) show the angular position detector 1 according to the third embodiment of the invention. FIG. 8(*a*) is a sectional view, as taken along the length of the rotary shaft 2, which shows the angular position detector 1. FIG. 8(*b*) is a transverse sectional view, as taken along the line VIII-VIII in FIG. 8(*a*).

The angular position detector 1 includes an annular magnetic shield 7 within which the magnet 3, the yoke 4, the magnetic sensor 5, and the angular position computing circuit 6 are disposed. The distance between the outer periphery of the yoke 4 and the magnetic shield 7 is set greater than the length L, as shown in FIG. 8(*b*), of the gaps 41 in the circumferential direction of the yoke 4, thereby minimizing a leakage of magnetic flux from the yoke 4 to the magnetic shield 7.

The magnetic sensor 5, as clearly shown in FIG. 8(*a*), has terminals which extend in parallel to the length of the rotary shaft 2 and connect with the angular position computing circuit 6. The angular position computing circuit 6 lead to an external microcomputer (not shown) through a wire harness 8.

Figure 9:
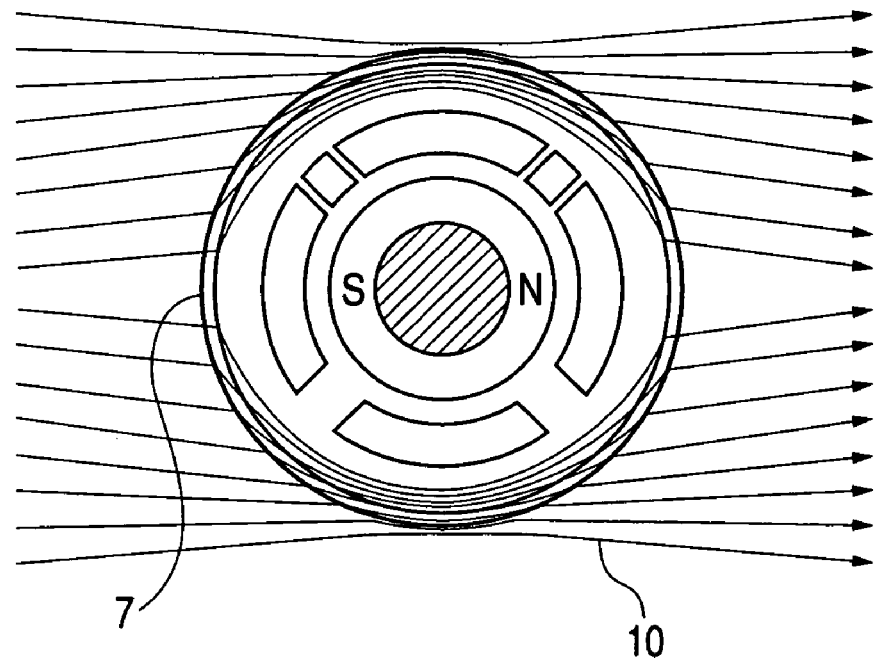
FIG. 9 is a transverse sectional view which shows magnetic flux flowing around the angular position detector of FIG. 8(a)

The magnetic shield 7 surrounding the yoke 4, as shown in FIG. 9, works to protect the yoke 4 from magnetic flux 10 flowing around the angular position detector 1, thereby eliminating adverse effects of the magnetic flux 10 on the density of magnetic flux within the gaps 41.

Figure 10:
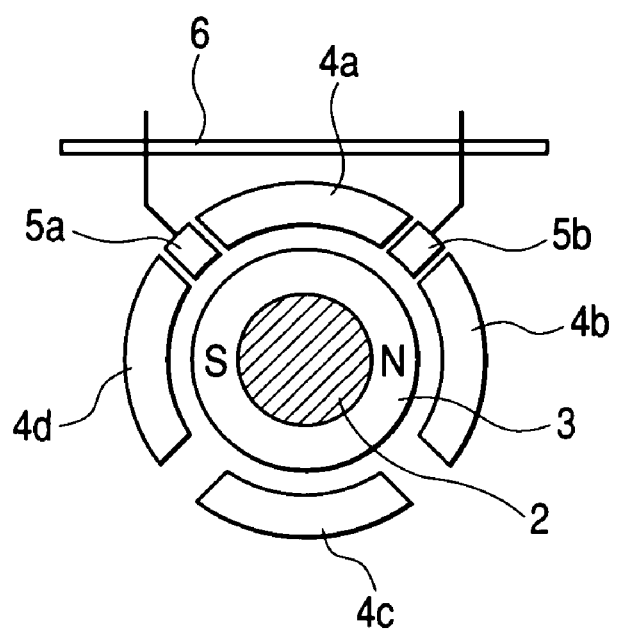
FIG. 10 is a transverse sectional view which shows a modification of the angular position detector of FIG. 8(a)

The magnetic sensor 5 may alternatively have terminals, as shown in FIG. 10, which extend in the radius direction of the yoke 4 and connect with the angular position computing circuit 6.

Other arrangements are identical with those in the first embodiment, and explanation thereof in detail will be omitted here.

Figure 11:
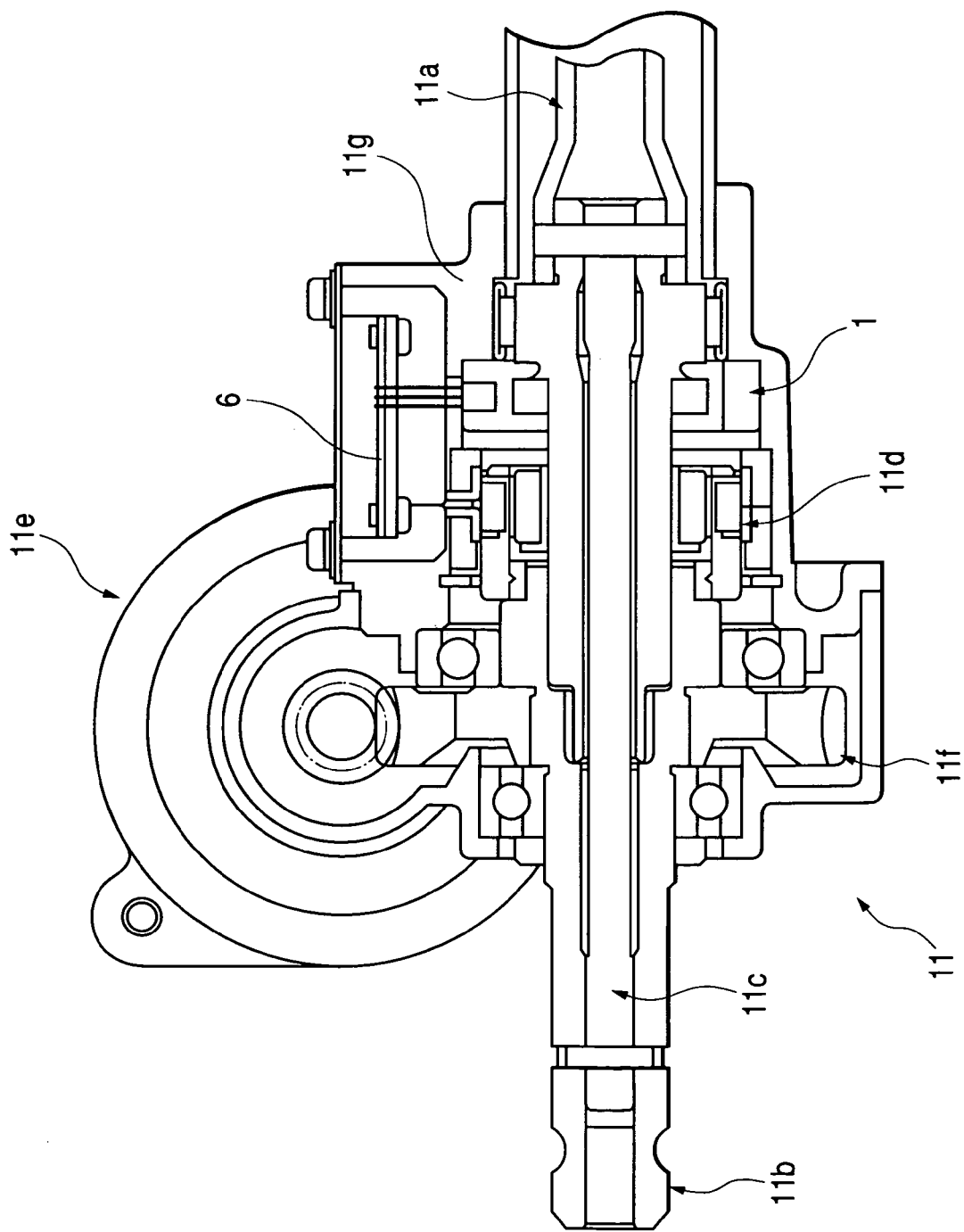
FIG. 11 is a sectional view which shows an electric power steering device equipped with an angular position detector according to the fourth embodiment of the invention.

FIG. 11 shows a fourth embodiment in which the angular position detector 1 of the first embodiment is installed in an electric power steering device 11 for automotive vehicles which works to assist in steering road wheels of the vehicle manually. Of course, the angular position detector 1 of one of the second and third embodiments may alternatively be employed in this embodiment.

The electric power steering device 11 includes an input shaft 11*a*, an output shaft 11*b*, a torsion bar 11*c*, a torque sensor 11*d*, a controller installed in the angular position computing circuit 6, an electric motor 11*e*, a torque transmitter 11*f*, and a housing 11*g*. The input shaft 11*a* is connected to a steering wheel of the vehicle. The output shaft 11*b* is connected to steerable road wheels of the vehicle. The torsion bar 11*c* connects the input and output shafts 11*a* and 11*b* together. The torque sensor 11*d* works to measure a steering effort or torque added to the steering wheel. The controller works to determine a target steering assist torque as a function of an output of the torque sensor 11*d*. The electric motor 11*e* works to produce the target steering assist torque determined by the controller. The torque transmitter 11*f* works to decrease the speed of an output shaft of the electric motor 11*e* to increase the torque outputted by the electric motor 11*e* and transmit it to the output shaft 11*b*. The housing 11*g* covers the torque transmitter 11*f*.

The angular position sensor of the angular position detector 1 is installed round the input shaft 11*a*. The angular position computing circuit 6 is fixed on the housing 11*g* and receives outputs of the angular position sensor and the torque sensor 11*d*. The angular position computing circuit 6 works to determine an angular position of the input shaft 11*a* (i.e., a steered angle of the steering wheel of the vehicle) as a function of the output of the angular position sensor (i.e., the magnetic sensor 5).

Figure 12A:
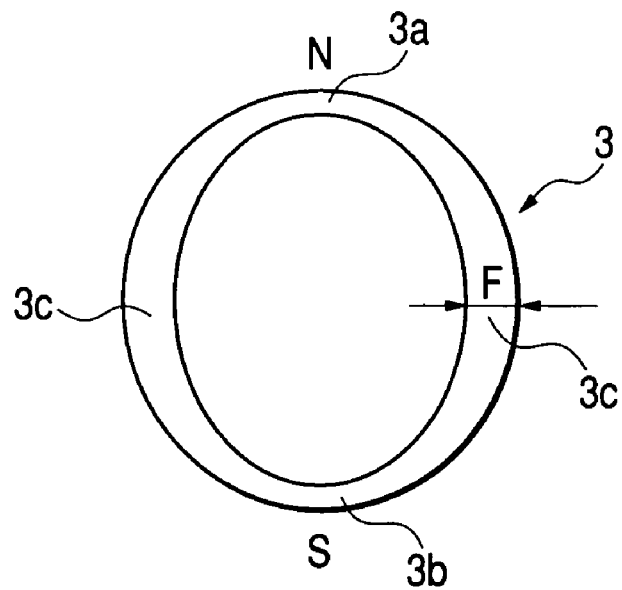
FIG. 12(a) is a plane view which shows a magnet of an angular position sensor according to the fifth embodiment of the invention.

FIGS. 12(*a*) and 12(*b*) show the magnet 3 of the angular position detector 1 according to the fifth embodiment of the invention. The same reference numbers as employed in the above embodiments refer to the same parts. FIG. 12(*a*) illustrates an example in which the magnet 3 is elongated along a line extending through the circumferential centers of the N-pole 3*a* and the S-pole 3*b*. FIG. 12(*b*) illustrates another example in which the magnet 3 is elongated perpendicular to the line extending through the circumferential centers of the, N-pole 3*a* and the S-pole 3*b*.

Figure 3B:
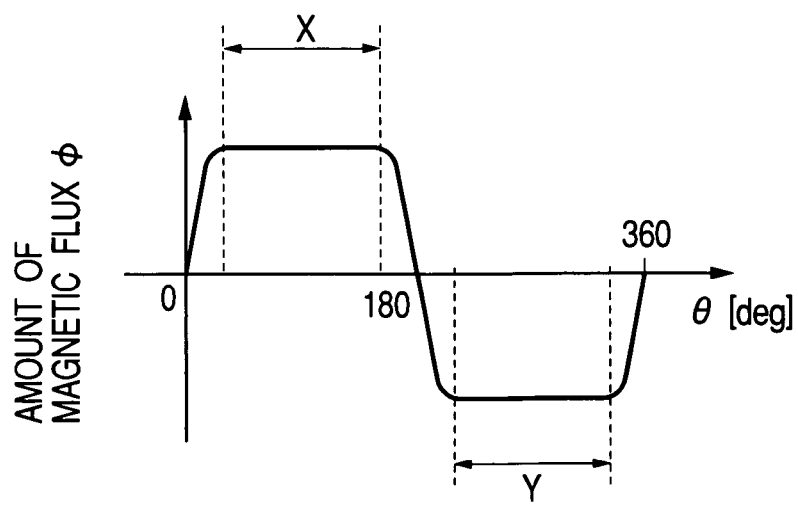
FIG. 3(b) is a graph which shows a periodic wave indicative of a change in amount of magnetic flux upon rotation of a rotary shaft to which a magnet is affixed.
Figure 4A:
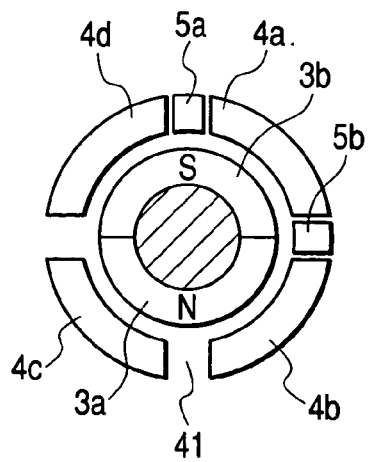
FIG. 4(a) is a transverse sectional view which shows a positional relation between a magnet and a rotary shaft when the rotary shaft is in an angular position of 0°.
Figure 4B:
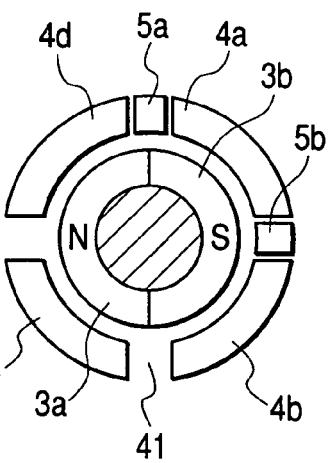
FIG. 4(b) is a transverse sectional view which shows a positional relation between a magnet and a rotary shaft when the rotary shaft is in an angular position of 90°.
Figure 4C:
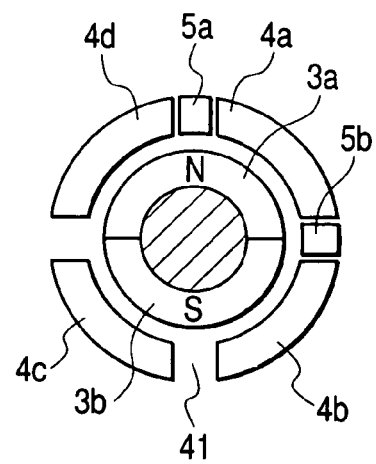
FIG. 4(c) is a transverse sectional view which shows a positional relation between a magnet and a rotary shaft when the rotary shaft is in an angular position of 180°.
Figure 4D:
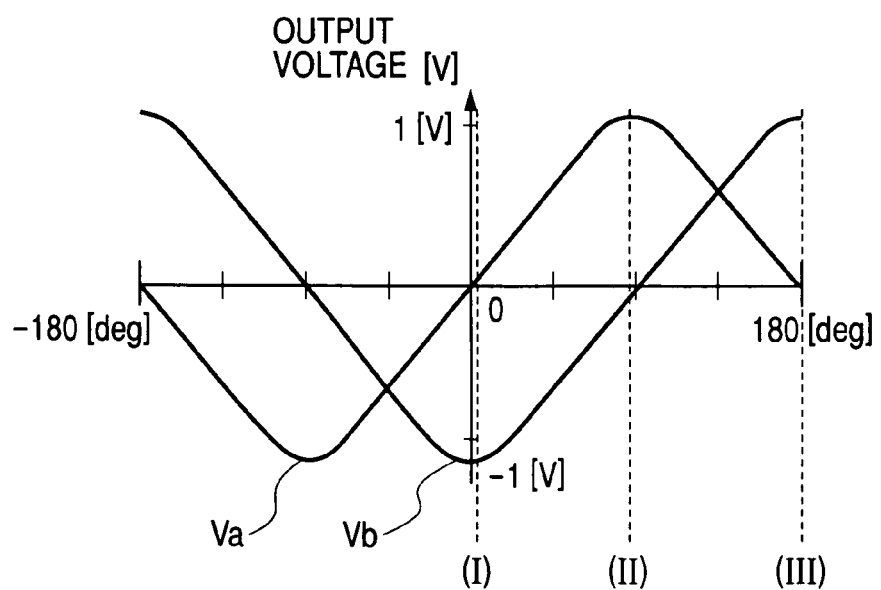
FIG. 4(d) is a graph which shows periodic wave indicative of changes in output voltages of sensor elements of a magnetic sensor upon rotation of a rotary shaft to which a magnet is affixed.

The magnet 3, as illustrated in each of FIGS. 12(*a*) and 12(*b*), is made of an oval-shaped ring and has the width F in the radius direction thereof which decreases gradually from the interfaces 3*c* between the N-pole 3*a* and S-pole 3*b* to the circumferential centers of the N-pole 3*a* and the S-pole 3*b*. Specifically, the width F of the circumferential centers of the N-pole 3*a* and the S-pole 3*b* is smaller than that of the interfaces 3*c*, in other words, the volume of the circumferential centers of the N-pole 3*a* and the S-pole 3*b* is smaller than that of the interfaces 3*c*. This causes a total amount of magnetic flux to be almost uniform, like the first embodiment, around the circumferential centers of the N-pole 3*a* and the S-pole 3b of the magnet 3. Rotation of the magnet 3 (i.e., the rotary shaft 2) will cause the amount of magnetic flux flowing through each of the sensor elements 5a and 5b of the magnetic sensor 5 to change cyclically in the form of a wave, as shown in FIG. 3(b). The amount of magnetic flux within a range X (i.e., around the circumferential center of the N-pole 3a) is substantially identical with that within a range Y (around the circumferential center of the N-pole 3b).

Figure 13A:
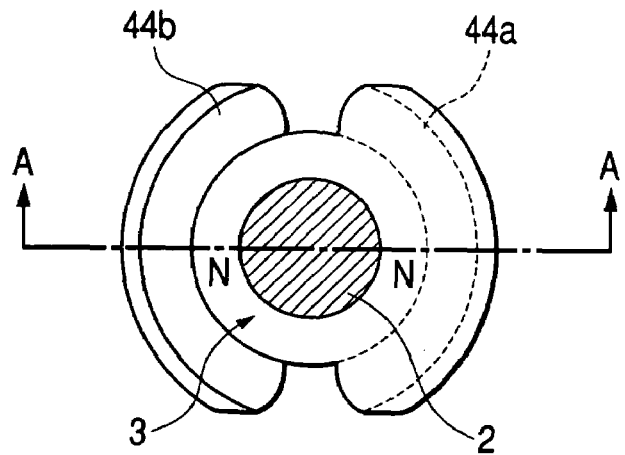
FIG. 13(a) is a plane view which shows an angular position sensor according to the fifth embodiment of the invention.
Figure 13B:
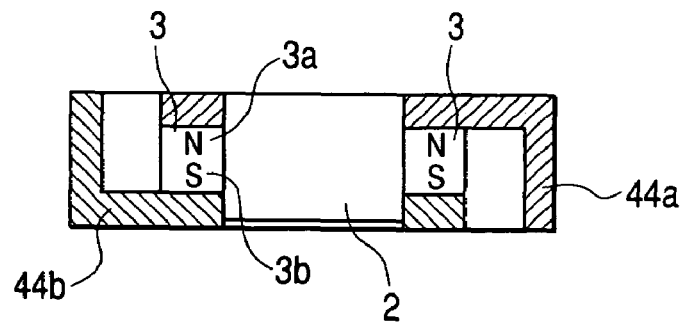
FIG. 13(b) is a vertical sectional view which shows as taken along the line A-A in FIG. 13(a)

FIGS. 13(a) and 13(b) show a modification of the angular position sensor of the angular position detector 1. The magnet 3 has the N-pole 3a and the S-pole 3b opposed to each other in the thickness-wise direction thereof (i.e., the lengthwise direction of the rotary shaft 2). The magnet 3 has the thickness and width that are uniform over the circumference thereof. Each of the N-pole 3a and the S-pole 3b is uniform in thickness over the entire circumference of the magnet 3. Sub-yokes 44a and 44b which are made of an arc-shaped soft magnetic member having an L-shaped cross section are, as clearly shown in FIG. 13(b), installed on ends of the N-pole 3a and the S-pole 3b of the magnet 3 in a diagonally opposed relation so that they surround portions of the periphery of the magnet 3. The sub-yokes 44a and 44b work to average magnetic flux flowing out of the magnet 3 in the radius direction thereof to produce a substantially uniform amount of magnetic flux. Other arrangements are identical with those in the first embodiment, and explanation thereof in detail will be omitted here.

Figure 14:
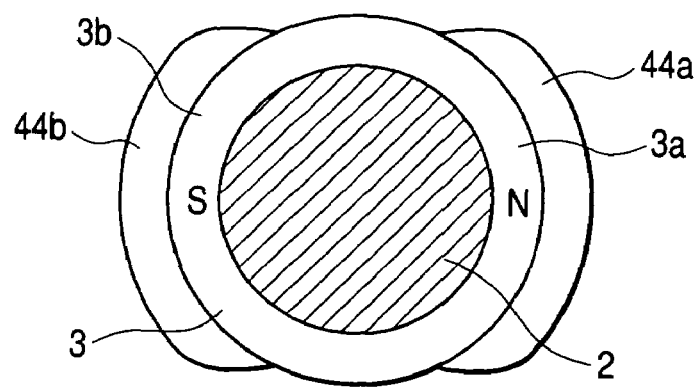
FIG. 14 is a plane view which shows a modification of the angular position sensor, as illustrated in FIG. 13(a)

FIG. 14 shows another modification of the angular position sensor of the angular position detector 1. The magnet 3 is uniform in thickness and width over the circumference thereof. The magnet 3 has the N-pole 3a and the S-pole 3b which are, like the first embodiment, diametrically opposed to each other across the center of the magnet 3. Specifically, the N-pole 3a and the S-pole 3b range over 180° of the circumference of the magnet 3, respectively. The sub-yokes 44a and 44b are installed on the periphery of the magnet 3 near the circumferential centers of the N-pole 3a and the S-pole 3b and works to regulate, like the ones in FIGS. 13(a) and 13(b), an amount of magnetic flux to be substantially uniform around the circumferential centers of the N-pole 3a and the S-pole 3b of the magnet 3. Other arrangements are identical with those in the first embodiment, and explanation thereof in detail will be omitted here.

Figure 15A:
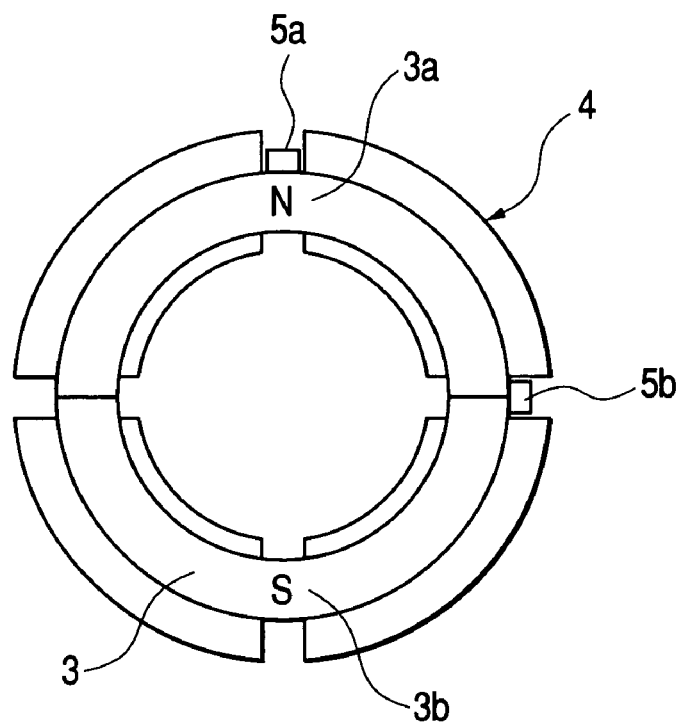
FIG. 15(a) is a plane view which shows an angular position sensor according to the sixth embodiment of the invention.
Figure 15B:
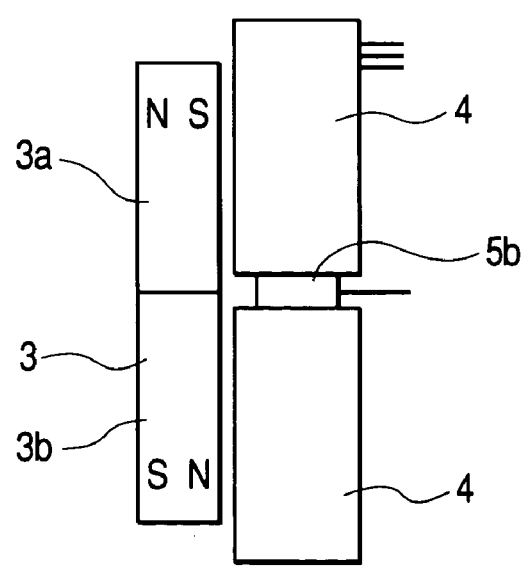
FIG. 15(b) is a side view of FIG. 15(a)

FIGS. 15(a) and 15(b) show the angular position sensor of the angular position detector 1 according to the sixth embodiment of the invention.

The magnet 3 is made of two arc-shaped magnetic members joined to each other each of which has the N-pole 3a and the S-pole 3b opposed to each other in the thickness-wise direction thereof (i.e., the lengthwise direction of the rotary shaft 2). The N-pole 3a and the S-pole 3b are uniform in thickness over the circumference of the arc-shaped magnetic members. The magnet 3 also has, as a whole, the N-pole 3a and the S-pole 3b opposed to each other in the radius direction thereof. The inner diameter of the magnet 3 is, as can be seen from FIG. 15(a), greater than that of the yoke 4, while the outer diameter of the magnet 3 is smaller than that of the yoke 4. The magnet 3 is, as clearly illustrated in FIG. 15(b), opposed at an end surface thereof to an end surface of the yoke 4. Other arrangements are identical with those in the first embodiment, and explanation thereof in detail will be omitted here.

Figure 16A:
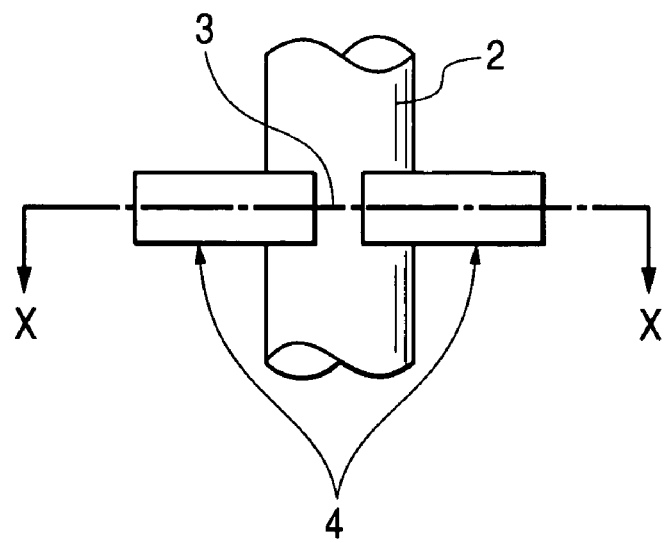
FIG. 16(a) is a side view which shows a modification of the angular position sensor of the sixth embodiment.
Figure 16B:
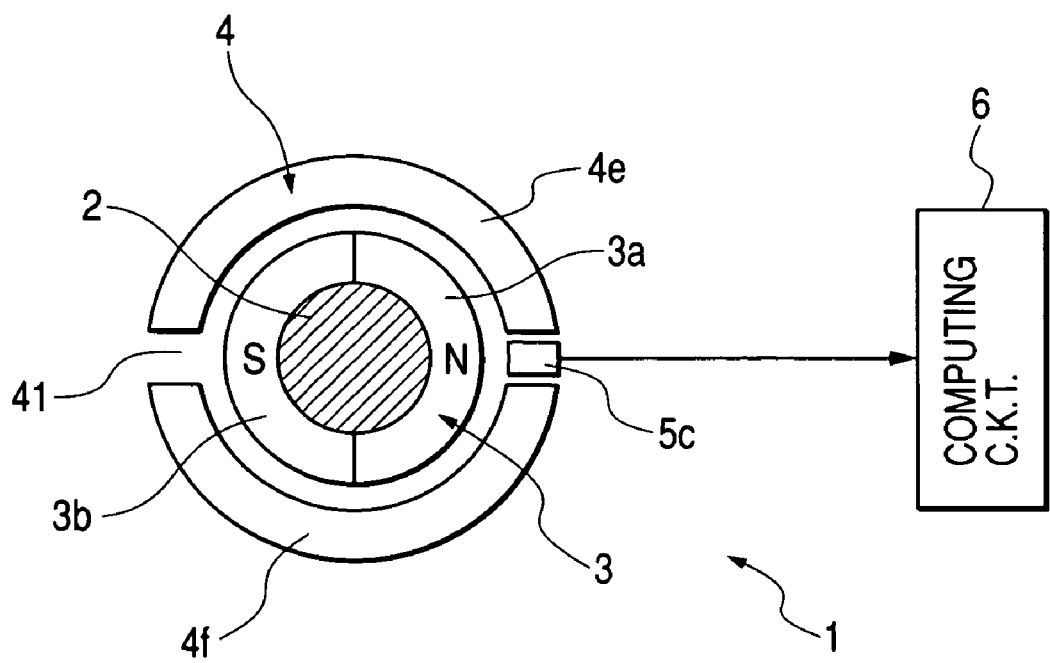
FIG. 16(b) is a transverse sectional view of FIG. 16(a)

The yoke 4 in each of the first to sixth embodiments is made up of four segments, but may alternatively be made up, as shown in FIGS. 16(a) and 16(b), two arc-shaped segments 4e and 4f. The yoke segments 4e and 4f are opposed at ends thereof to each other through the gaps 41 located 180° away from each other. A magnetic sensor element 5c is disposed within one of the gaps 41. The yoke 4 may alternatively be made up of more than four segments. Other arrangements are identical with those in the first embodiment, and explanation thereof in detail will be omitted here.

The angular position detector 1 of the seventh embodiment of the invention will be described below with reference to FIGS. 17 to 22.

Figure 17:
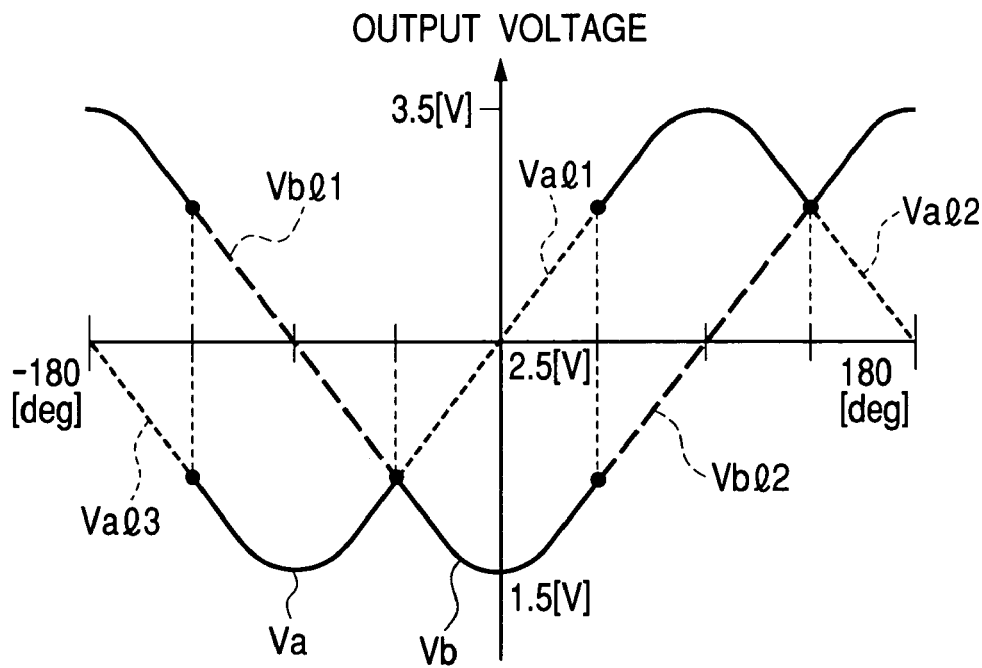
FIG. 17 is a graph which shows ideal waves indicative of changes in output voltage of sensor elements of a magnetic sensor installed in an angular position sensor upon rotation of a rotary shaft according to the seventh embodiment of the invention.
Figure 18:
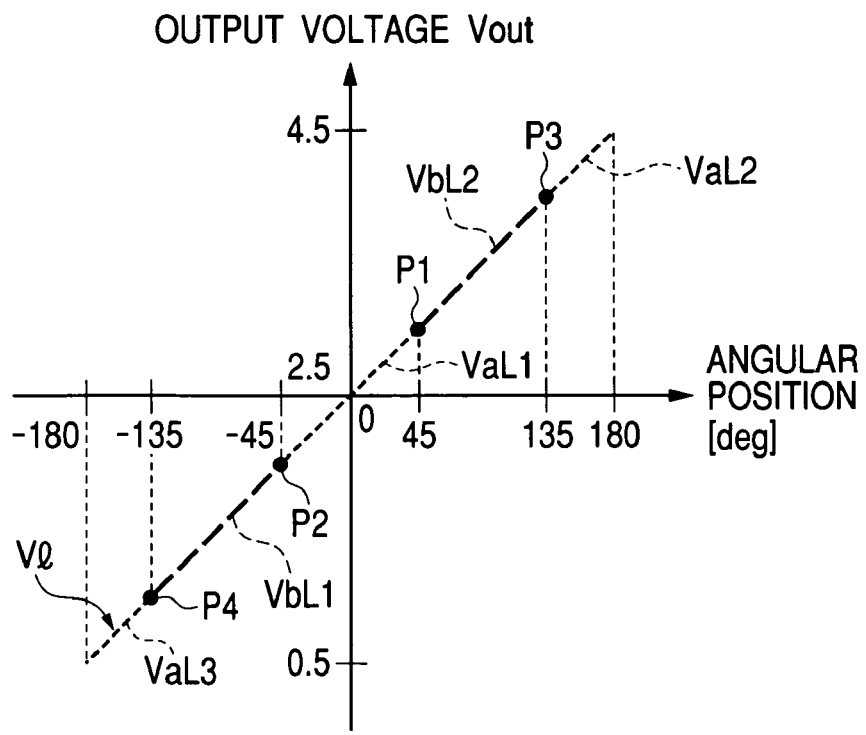
FIG. 18 is a graph which shows an ideal wave indicative of a change in output voltage of an angular position computing circuit of the seventh embodiment.

FIG. 17 demonstrates ideal waveforms of the output voltages Va and Vb of the sensor elements 5a and 5b of the magnetic sensor 5. FIG. 18 demonstrates an ideal output voltage Vl of the angular position computing circuit 6.

The waveform of the output voltage Va of the sensor element 5a in an angular range of a complete turn of the rotary shaft 2 (i.e., −180° to +180°) includes straight segments Va11, Va12, and Va13. The waveform of the output voltage Vb of the sensor element 5b in the angular range of a complete turn of the rotary shaft 2 includes straight segments Vb11 and Vb12. The output voltages Va and Vb are of substantially a triangular shape and shifted 90° apart in phase. The angular position computing circuit 6 works to perform the operations, as discussed in the first embodiments, to bring signs of inclinations of the straight segments Va11, Va12, Va13 Vb11, and Vb12 into agreement with each other and move them in parallel to form a straight line, as shown in FIG. 18, made of a combination of the straight segments Va11, Va12, Va13 Vb11, and Vb12. This enables the absolute angular position of the rotary shaft 2 to be determined over an angular range of 360° correctly.

The magnetic sensor 5, as described above, works to measure the amount of magnetic flux produced from the magnet 3 as the magnetic flux density. Usually, there is a variation in amount of magnetic flux produced by the magnet 3 due to a geometrical production error thereof, which will result in variations in the output voltages Va and Vb of the sensor elements 5a and 5b of the magnetic sensor 5. The variations in the output voltages Va and Vb will result in a variation in the output voltage Vl of the angular position computing circuit 6. Specifically, the level of voltage appearing at an end of each of the straight segments Va11, Va12, Va13 Vb11, and Vb12 (i.e., at each of joints P1, P2, P3, and P4 of the straight segments Va11, Va12, Va13 Vb11, and Vb12) may not agree with that of an adjacent one of the straight segments Va11, Va12, Va13 Vb11, and Vb12, thus resulting in shifts between the straight segments Va11, Va12, Va13 Vb11, and Vb12 on the line of FIG. 18.

In order to avoid the above problem, the angular position computing circuit 6 of this embodiment is designed to correct the output voltages Va and Vb of the sensor elements 5a and 5b of the magnetic sensor 5, as discussed below, to ensure the linearity of the waveform of the output voltage Vl of the angular position computing circuit 6.

Figure 19:
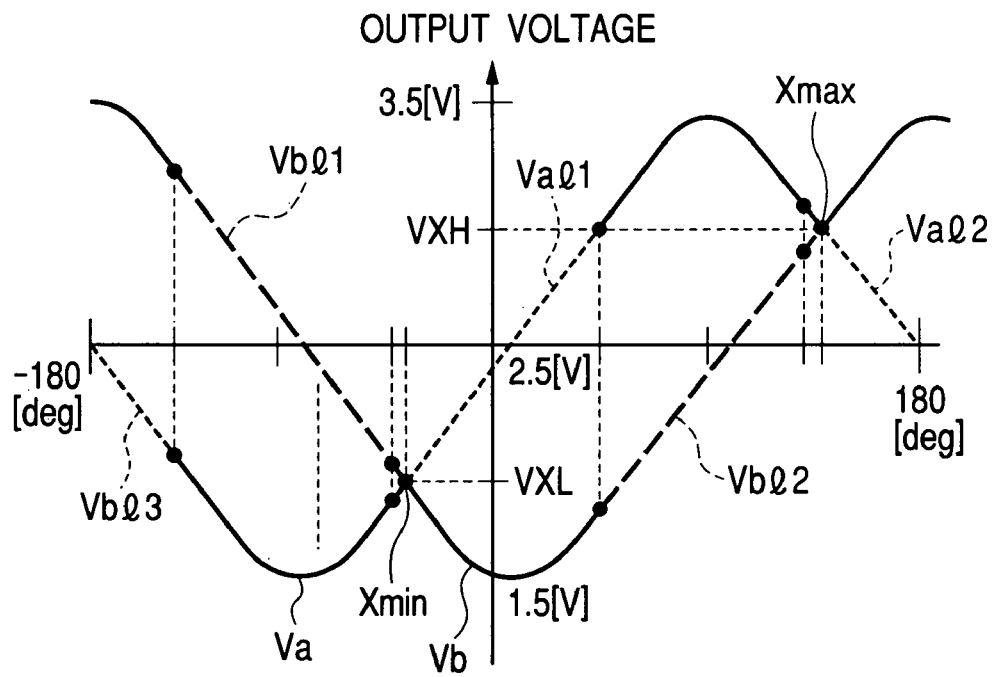
FIG. 19 is a graph which shows waves indicative of actual changes in output voltage of sensor elements of a magnetic sensor installed in an angular position sensor upon rotation of a rotary shaft according to the seventh embodiment of the invention.
Figure 20:
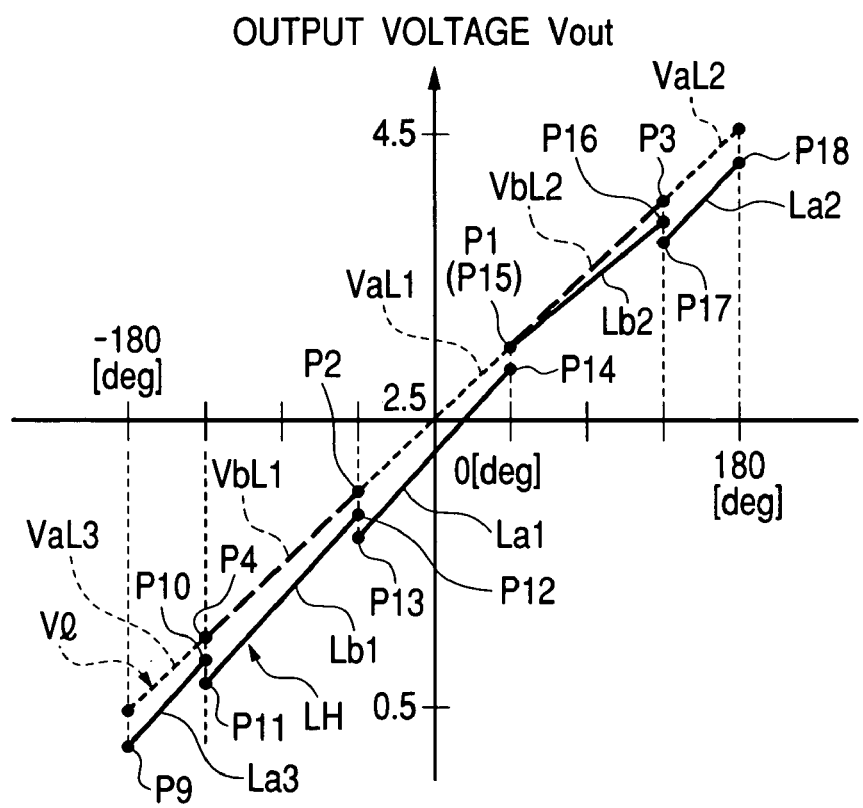
FIG. 20 is a graph which shows an output voltage of an angular position computing circuit in the event that straight segments of waveforms of output voltages of sensor elements are out of alignment to each other.
Figure 21:
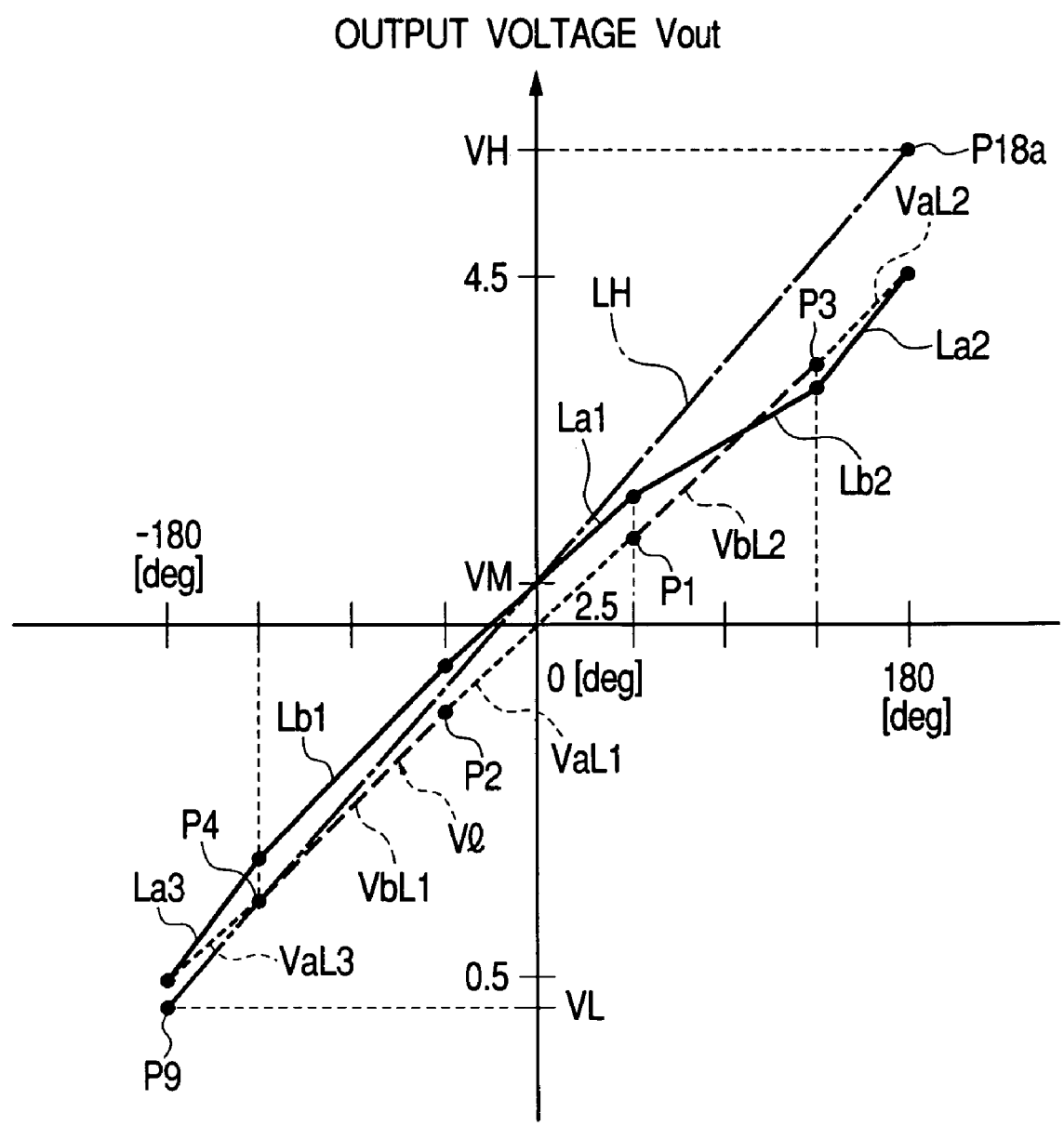
FIG. 21 is a graph which shows an output voltage of an angular position computing circuit after being corrected.
Figure 22:
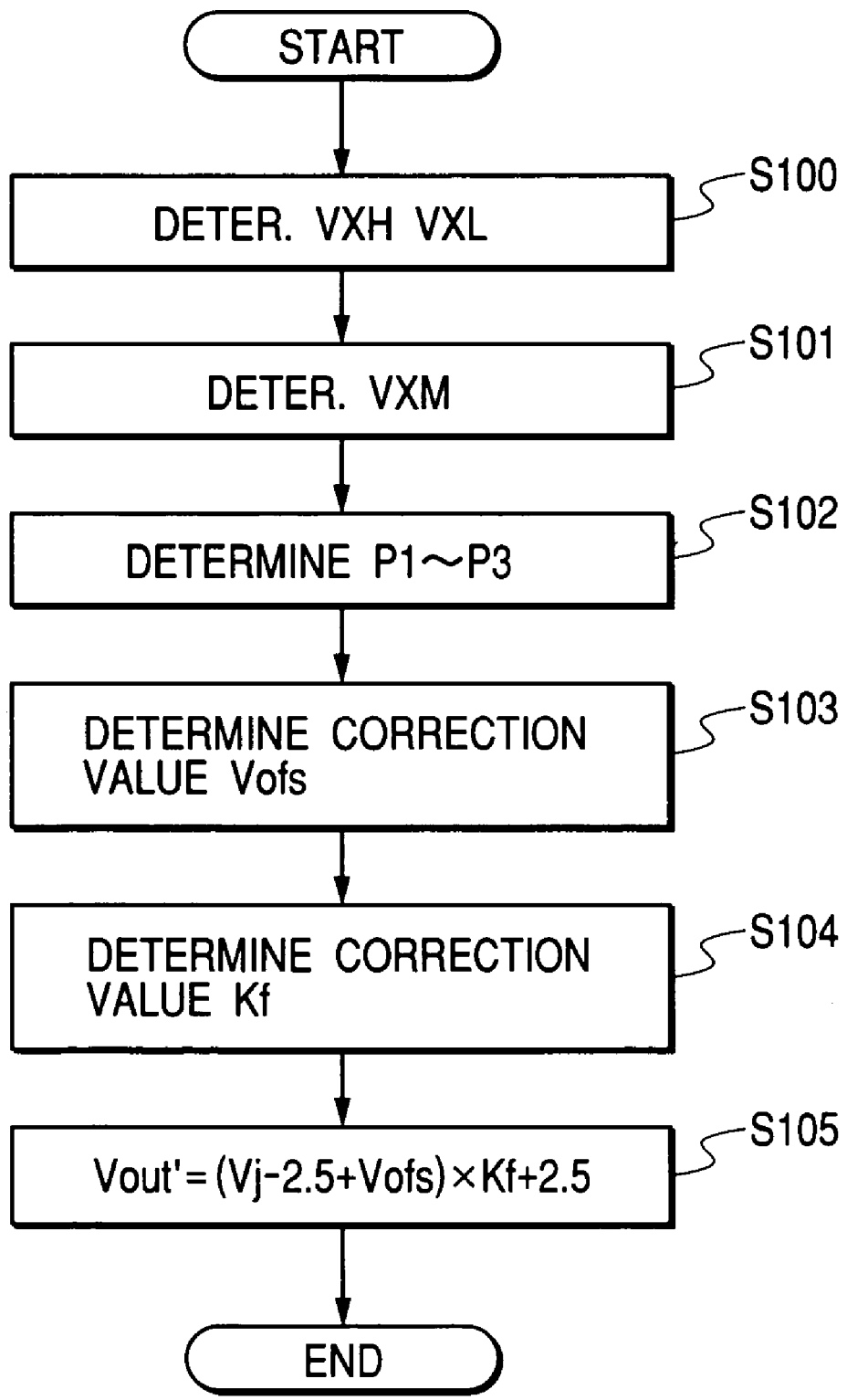
FIG. 22 is a flowchart of a program executed by an angular position computing circuit to produce the output voltage, as illustrated in FIG. 21.

FIG. 19 shows actual examples of periodic waves of the output voltages Va and Vb of the sensor elements 5a and 5b of the magnetic sensor 5. FIG. 20 shows an output voltage LH of the angular position computing circuit 6 in the event that the straight segments Va11, Va12, Va13 Vb11, and Vb12 (as expressed by La1, La2, La3, Lb1, and Lb2 in the drawing) of the waveforms of the output voltages Va and Vb are out of alignment with each other. FIG. 21 shows the output voltage LH of the angular position computing circuit 6 after voltages appearing at the joints P1, P2, P3, and P4 of the straight segments La1, La2, La3, Lb1, and Lb2 are corrected. FIG. 22 is a flowchart of logical steps or a program performed by the angular position computing circuit 6 to ensure the linearity of the waveform of the output voltage LH.

After entering the program, the routine proceeds to step 100 wherein two intersections Xmax and Xmin, as shown in FIG. 19, of the waveforms of the output voltages Va and Vb resulting from a 90° shift in phase thereof are found to determine output voltages VXH and VHL appearing at the intersections Xmax and Xmin.

The routine proceeds to step 101 wherein a middle voltage VXM between the output voltages VXH and VHL, as determined in step 100, is calculated according to an equation below.

$$VXM=(VXH+VXL)/2$$

The routine proceeds to step 102 wherein the same operations as those in FIG. 5 are executed to determine locations (i.e., voltages) of ends of the straight segments La1, La2, La3, Lb1, and Lb2, as illustrated in FIG. 20, to be connected together (i.e., the joints P1, P2, P3, and P4). In execution of the program of FIG. 5, 3.0V in step 1 is replaced with the output voltage VXH, 2.0V in step 2 is replaced with the output voltage VXL, and 2.5V in step 4 is replaced with the middle voltage VXM.

A manner of determining the joints P1, P2, P3, and P4 will be described below in detail.

Each of voltage levels P10 to P17 at ends of the straight segments La1, La2, La3, Lb1, and Lb2, as illustrated in FIG. 20, to be connected together are, as described above, does not identical with that of an adjacent one. Thus, the straight segment Lb1 is first moved in parallel until a difference between the voltage P11 of the straight segment Lb1 and the voltage P11 of the straight segment La3 decreases to zero. In other words, the straight segment Lb1 is moved while keeping an inclination thereof as it is to bring the voltage P11 into agreement in level with the voltage P10 of the straight segment La3. Similarly, the straight segment La1 is moved in parallel to bring the voltage P13 thereof into agreement with the voltage P12 of the parallel-moved straight segment Lb1. The straight segment Lb2 is moved in parallel to bring the voltage P15 thereof into agreement with the voltage P14 of the parallel-moved straight segment La1. Finally, the straight segment La2 is moved in parallel to bring the voltage P17 thereof into agreement with the voltage P16 of the parallel-moved straight segment Lb2. This makes a single line. The voltage P18 at the end of the straight segment La2 after moved parallel is illustrated as a maximum voltage P18a in FIG. 21. For ease of visibility, the maximum voltage P18a is illustrated in FIG. 21 as being much higher than 4.5V.

Next, a straight line LH is defined, as shown in FIG. 21, which extends between the minimum voltage P9 and the maximum voltage P1 8a at the parallel-moved straight segment La2. A middle voltage value VM between the value VH of the maximum voltage P1 8a and the value VL of the minimum voltage P9 is determined using the following equation.

$$VM=(VH+VL)/2$$

Afterwards, the routine proceeds to step 103. The middle voltage value VM is not always identical with a middle voltage value 2.5V on the ideal straight line VI, as indicated by a dotted line in FIGS. 20 and 21. Thus, a middle voltage correcting value Vofs is determined in accordance with an equation below to correct the middle voltage value VM to 2.5V.

$$Vofs=VM-2.5$$

The routine proceeds to step 104. The inclination K of the line LH extending between the maximum and minimum voltages P9 and P1 8a is not always identical with an inclination of the ideal line Vl. Thus, an inclination correcting value Kf is determined in accordance with an equation below to bring the inclination K into agreement with that of the ideal line Vl.

$$Kf=4/(VH-Vl)$$

The routine proceeds to step 104 wherein an actual output voltage Vj of the angular position computing circuit 6 is corrected in accordance with an equation below using the middle voltage correcting value Vofs and the inclination correcting value Kf to produce an output voltage Vout'.

$$Vout'=(Vj-2.5+Vofs) \times Kf+2.5$$

The above correction works to bring the output voltage Vout' of the angular position computing circuit 6 nearly into agreement with an ideal output voltage. Specifically, the line made up of the straight segments La1, La2, La3, Lb1, and Lb2 in the parallel-moving operation in step 102 is corrected, as indicated by a solid line in FIG. 21, to almost overlap the ideal line Vl made up of segments VaL1, VaL2, VaL3, VbL1, and VbL2. An output voltage range of the angular position computing circuit 6 is also adjusted to an ideal output voltage range of 0.5V to 4.5V. The above operations enable the angular position computing circuit 6 to work to measure an absolute angular position of the rotary shaft 2 over a full range of 360° with minimum errors.

As apparent from the above discussion, correction values used to connect the straight segments La1, La2, La3, Lb1, and Lb2 at the joints P1, P2, P3, and P4 in the parallel-moving operation in step 102 are different from each other, thus resulting in an increased operation load on the angular position computing circuit 6. Usually, a steering wheel of automotive vehicles stays at a neutral position (angular position of zero (0°)) for the longest period of time. Therefore, in a case where the angular position detector 1 is installed in the automotive electric power steering device 11 of FIG. 11, a decrease in number of operations to determine the joints P1, P2, P3, and P4, in other words, a decrease in operation load on the angular position computing circuit 6 is accomplished by setting angular positions of the joints P1, P2, P3, and P4 to any angular positions other than the neutral position of the steering wheel. The setting of the angular positions of the joints P1, P2, P3, and P4 to any angular positions other than the neutral position of the steering wheel is achieved by moving the magnet 3 in a circumferential direction of the rotary shaft 2 (i.e., the steering shaft) upon installation on the rotary shaft 2.

The waveforms of the output voltages Va and Vb of the sensor elements 5a and 5b, as illustrated in FIG. 19, are unchanged. A further decrease in operation load on the angular position computing circuit 6 may be achieved by rotating the steering wheel over 360° one time in either of clockwise and counterclockwise directions to determine the middle voltage correcting value Vofs and the inclination correcting value Kf as fixed initial values.

The angular position detector 1 of the eighth embodiment will be described below with reference to FIG. 23.

Figure 23:
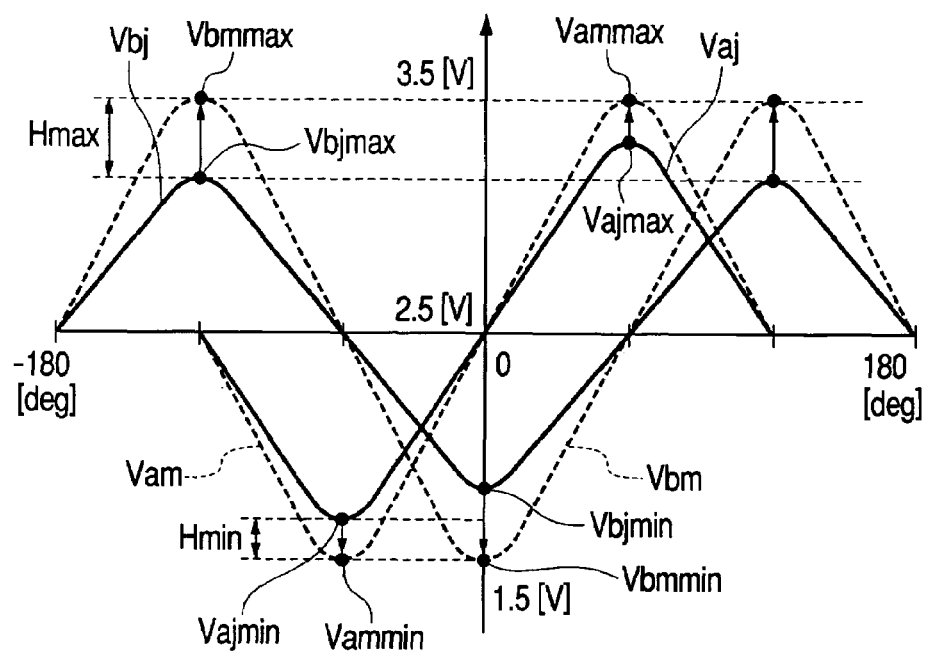
FIG. 23 is a graph which shows an ideal wave indicative of a change in output voltage of an angular position computing circuit according to the eighth embodiment of the invention.

FIG. 23 demonstrates actual and ideal periodic waveforms of the output voltages Va and Vb of the sensor elements 5a and 5b of the magnetic sensor 5.

Usually, the amount of magnetic flux produced by the magnet 3 decreases gradually with a rise in ambient temperature, thus resulting in a decrease in magnetic flux density to be measured by the sensor elements 5a and 5b. This will cause the output voltages Va and Vb of the sensor elements 5a and 5b to drop. In order to eliminate this problem, the angular position detector 1 of this embodiment is designed to compensate for the drops in output voltages Va and Vb of the sensor elements 5a and 5b arising from a rise in ambient temperature. This compensation will be described below in detail.

In FIG. 23, broken lines Vam and Vbm represent the ideal waveforms of the output voltages Va and Vb, respectively. Solid lines Vaj and Vbj represent the actual waveforms of the output voltages Va and Vb, respectively.

The magnetic sensor 5 is equipped with a temperature sensor (not shown) which works to measure the temperature around the magnetic sensor 5. Some of available Hall sensors are equipped with a temperature compensating function. The first and second sensor elements 5a and 5b of this embodiment are each implemented by the Hall sensor. Specifically, the first and second sensor elements 5a and 5b have installed therein a temperature-to-correction value map for use in brining the actual output voltages Vaj and Vbj of the sensor elements 5a and 5b into agreement with the ideal output voltages Vam and Vbm, respectively. The temperature-to-correction value map is preselected in terms of type of the magnet 3 and/or the amount of magnetic flux generated by the magnet 3.

Specifically, the magnetic sensor 5 monitors the ambient temperature, selects correction values from the temperature-to-correction value maps, and corrects the actual output voltages Vaj and Vbj into agreement with the ideal output voltages Vam and Vbm, respectively, thereby compensating for the drops in output voltages Va and Vb of the sensor elements 5a and 5b due to a temperature characteristic of the magnet 3.

Instead of compensating for the drops in output voltages Va and Vb of the sensor elements 5a and 5b in themselves, the angular position computing circuit 6 may be designed to perform operations, as discussed below, to bring the actual output voltages Vaj and Vbj into agreement with the ideal output voltages Vam and Vbm, respectively. Specifically, maximum values Vammax and Vbmmax and minimum values Vammin and Vbmmin of the ideal output voltages Vam and Vbm are prestored in the angular position computing circuit 6. The angular position computing circuit 6 calculates differences Hmax between a maximum value Vajmax of the actual output voltage Vaj and Vammax and between a maximum value Vbjmax of the actual output voltage Vbj and between Vbmmax and differences Hmin between a minimum value Vajmin of the actual output voltage Vaj and Vammin and between a minimum value Vbjmin of the actual output voltage Vbj and Vbmmin and corrects the maximum values Vajmax and Vbjmax and the minimum values Vajmin and Vbjmin of the actual output voltages Vaj and Vbj using the differences Hmax and Hmin so as to bring the actual output voltages Vaj and Vbj into agreement with the ideal output voltages Vam and Vbm.

Figure 12B:
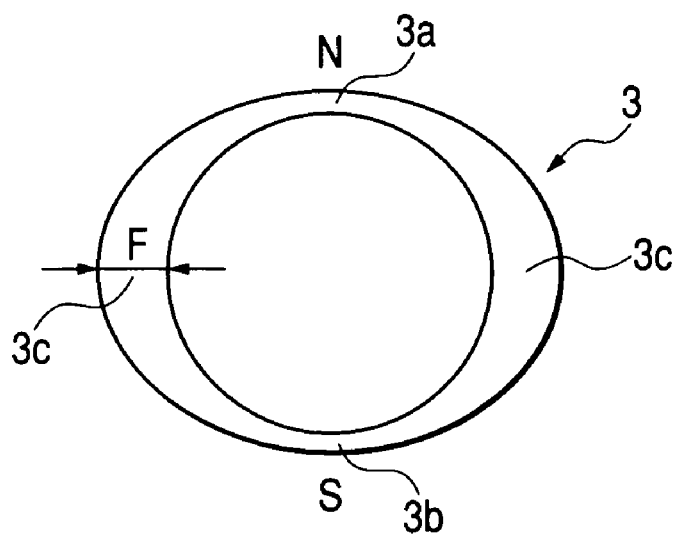
FIG. 12(b) is a plane view which shows a modification of the magnet as illustrated in FIG. 12(a)
Figure 24A:
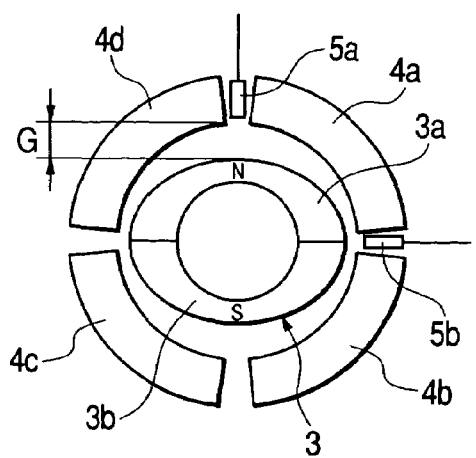
FIG. 24(a) is a plane view which shows an example of an angular position sensor using the magnet, as illustrated in FIG. 12(b)
Figure 24B:
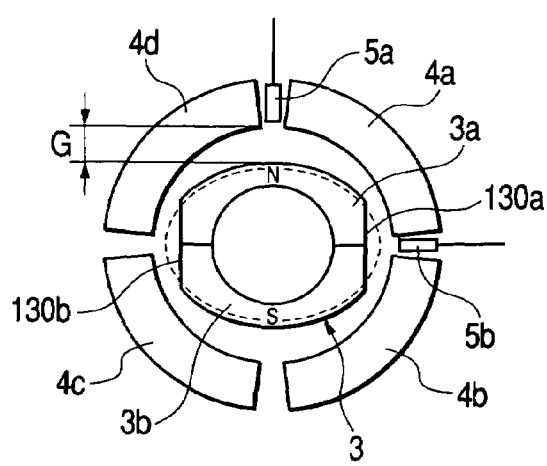
FIG. 24(b) is a plane view which shows an angular position sensor according to the ninth embodiment of the invention.
Figure 25:
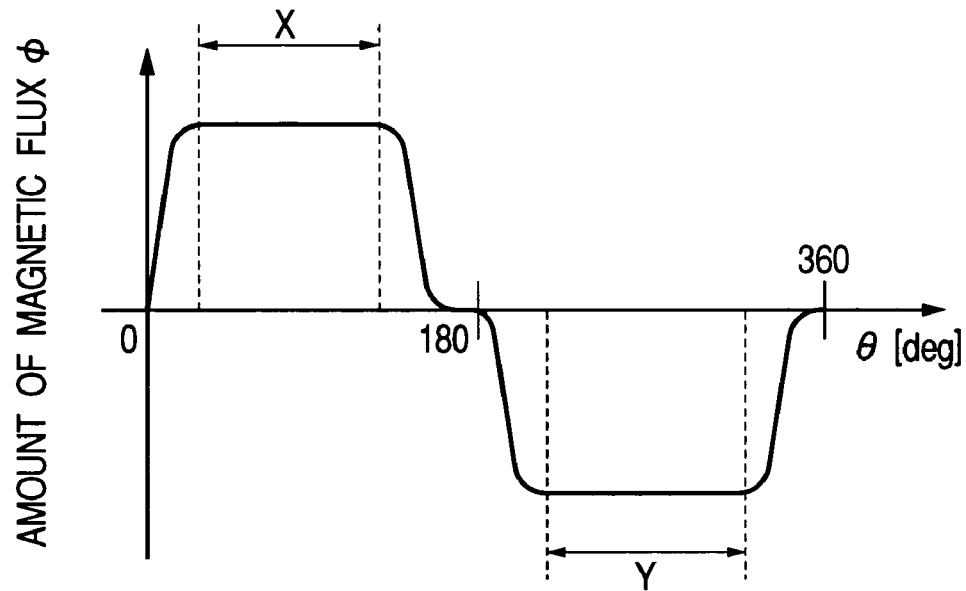
FIG. 25 is a graph which shows the amount of magnetic flux produced by a magnet installed in the angular position sensor as illustrated in FIG. 24(b)

The angular position detector 1 according to the ninth embodiment will be described below with reference to FIGS. 24(a), 24(b), and 25. FIG. 24(a) shows the angular position sensor of the angular position detector 1 equipped with the magnet 3, as illustrated in FIG. 12(b). FIG. 24(b) shows the angular position sensor of the angular position detector 1 equipped with the magnet 3 of this embodiment. In FIG. 24(b), a broken line indicates a profile of the magnet 3 of FIG. 24(a). FIG. 25 demonstrates a periodic wave indicating a change in amount of magnetic flux φ which is generated by the magnet 3 of FIG. 24(b) and measured by the sensor elements 5a and 5b of the magnetic sensor 5 as a function of an angular position θ of the rotary shaft 2.

The magnet 3, as illustrated in FIG. 12(b), has a circular inner periphery and an oval outer periphery. In a case, as illustrated in FIG. 24(a), where the magnet of FIG. 12(b) is disposed within the yoke 4 whose inner periphery is circular, the distance G between the circumferential centers of the N-pole 3a and the S-pole 3b of the magnet 3 and the inner periphery of the yoke 4 is much greater than the distance between interfaces between the N-pole 3a and the S-pole 3b and the inner periphery of the yoke 4. This causes the amount of magnetic flux which is generated around the circumferential centers of the N-pole 3a and the S-pole 3b and leaks out of the yoke 4 to increase, thus resulting in a decreased density of magnetic flux flowing through the yoke 4, which leads to a decrease in output of the magnetic sensor 5.

In order to avoid the above problem, the magnet 3 has the interfaces between the N-pole 3a and the S-pole 3b ground or cut to have flat side surfaces 130a and 130b. This permits the width of the circumferential centers of the N-pole 3a and the S-pole 3b in the radius direction of the magnet 3 to be increased more than that of the magnet 3, as illustrated in FIG. 24(a). Specifically, the gap G between the circumferential centers of the N-pole 3a and the S-pole 3b and the inner periphery of the yoke 4 is allowed to be smaller than that in FIG. 24(a). This results in a decreased leakage of magnetic flux outside the yoke 4.

The magnet 3 of FIG. 24(b) is, as apparent from the above, substantially circular as compared with that of FIG. 24(a). The width of the circumferential centers of the N-pole 3a and the S-pole 3b and the width of the interfaces between the N-pole 3a and the S-pole 3b are so selected as to have a relation therebetween which produces the magnetic flux changing in the form of a wave, as illustrated in FIG. 25, upon rotation of the rotary shaft 2. Specifically, the amounts of magnetic flux within a range X (i.e., around the circumferential center of the N-pole 3a) and a range Y (around the circumferential center of the N-pole 3b) are substantially uniform.

Figure 26:
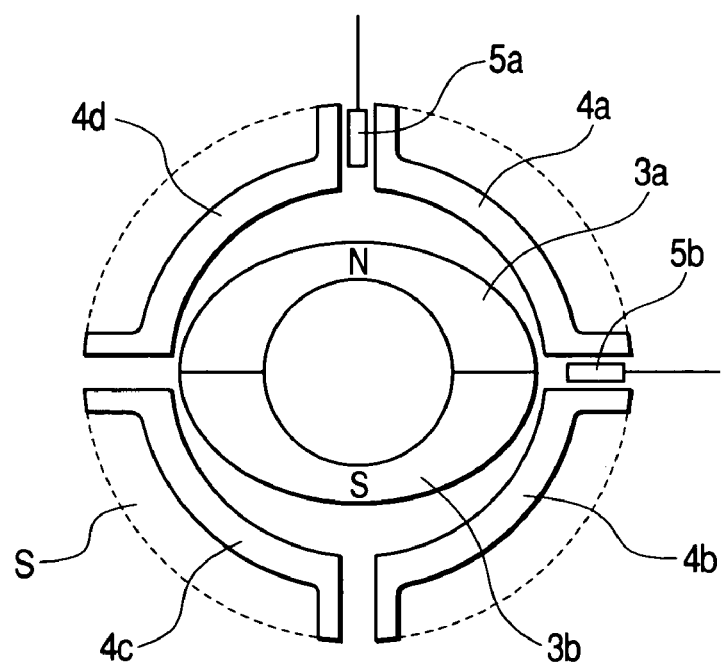
FIG. 26 is a plane view which shows an angular position sensor according to the tenth embodiment of the invention.

FIG. 26 shows the angular position sensor of the angular position detector 1 according to the tenth embodiment of the invention.

The yoke 4 in each of the first to ninth embodiments is, as described above, made of a metallic soft magnetic material. The yoke 4 of this embodiment is made up of four soft magnetic plates 4a, 4b, 4c, and 4d whose thickness in the radius direction of the yoke 4 is smaller than that of the yoke segments 4a to 4d in each of the first to ninth embodiments. The magnetic plates 4a to 4d of this embodiment are each formed by press such as punching or bending and smaller in weight than the yoke segments 4a to 4d in each of the first to ninth embodiments by the volume S.

The magnetic plates 4a to 4d may alternatively be formed by grinding metallic blocks.

Figure 27A:
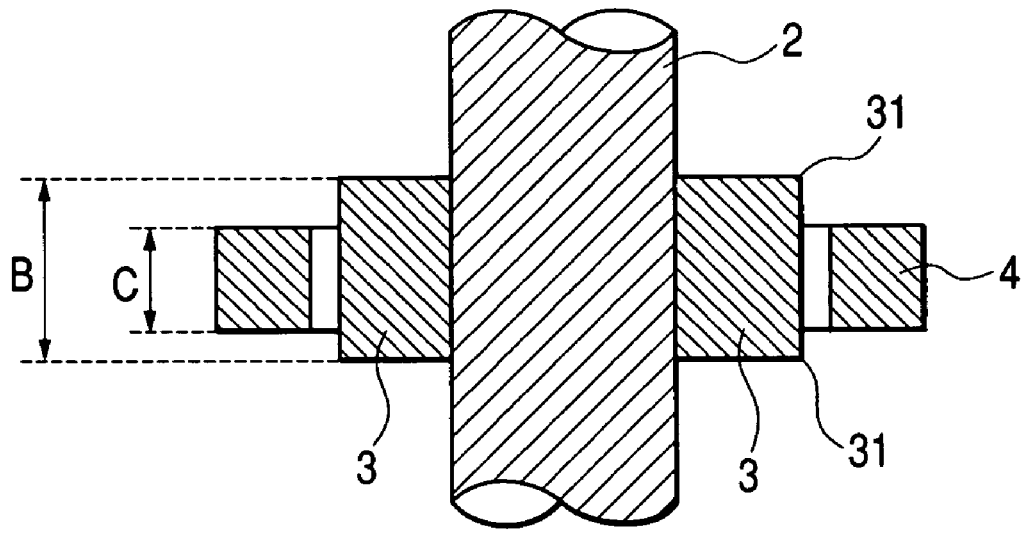
FIG. 27(a) is a vertical sectional view which shows an angular position sensor according to the eleventh embodiment of the invention.
Figure 27B:
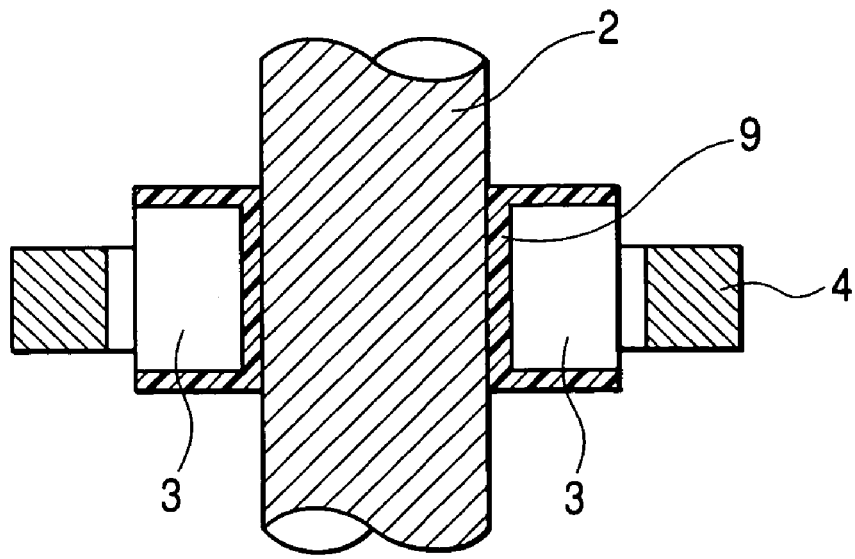
FIG. 27(b) is a vertical sectional view which shows a modification of the angular position sensor of FIG. 27(a).

FIGS. 27(a) and 27(b) show the angular position sensor of the angular position detector 1 according to the eleventh embodiment of the invention.

The magnet 3 of FIG. 27(a) has a profile identical with that of FIG. 24(a) or FIG. 24(b), but different therefrom in that the thickness B is greater than the thickness C of the yoke 4. Specifically, corners 31 of the magnet 3 are located outside the yoke 4 in the lengthwise direction of the rotary shaft 2. This causes the magnetic flux to flow from the corners 31 out of the yoke 4 which serves to attract incoming iron powders to avoid sticking thereof to the inner periphery of the yoke 4 and an opposed portion of the outer periphery of the magnet 3, thus ensuring the stability of flow of magnetic flux from the magnet 3 to the inner periphery of the yoke 4 for an extended period of time.

The magnet 3 may be made integrally with the rotary shaft 2 using insert-molding techniques. This improves cocentricity of the magnet 3 and the rotary shaft 2.

FIG. 27(*b*) shows a modification of the magnet 3 of FIG. 27(*a*).

The magnet 3 is affixed to the rotary shaft 2 through a ring-shaped resinous magnet holder 9. The magnet holder 9 may be formed integrally with the rotary shaft 2 using insert-molding techniques. The magnet 3 may be made of a ferrite magnet or a plastic bonded magnet.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An angular position sensor comprising:
    a hard magnetic member connected to a rotary member, said hard magnetic member having a circumference and magnetized in a circumferential direction thereof to produce a magnetic field therearound;
    a soft magnetic member disposed within the magnetic field produced by said hard magnetic member to form a magnetic circuit, rotation of the rotary member to change a relative position between the magnetic field and said hard magnetic member causes a magnetic flux density in the magnetic circuit to change; and
    a magnetic flux density measuring sensor disposed at an interval away from said soft magnetic member, said magnetic flux density measuring sensor working to measure the magnetic flux density in the magnetic circuit to produce a signal as a function of the magnetic flux density as indicating an angular position of the rotary member,
    wherein said hard magnetic member is so designed as to create magnetic flux that is substantially uniform in amount within a given angular range in a circumferential direction thereof.

2. An angular position sensor as set forth in claim 1, wherein said hard magnetic member has a first magnetic pole and a second magnetic pole which are different in polarity from each other and joined at ends thereof together to define the circumference of said hard magnetic member, and wherein the first and second magnetic poles work to create the magnetic flux that is substantially uniform in amount within angular ranges defined around central portions of the first and second magnetic poles in the circumferential direction of said hard magnetic member.

3. An angular position sensor as set forth in claim 2, wherein the central portions of the first and second magnetic poles have a thickness defined in a direction perpendicular to a plane extending over the circumference of said hard magnetic member which is smaller than a thickness of portions of the first and second magnetic poles around interfaces between ends of the first and second magnetic poles.

4. An angular position sensor as set forth in claim 2, wherein the central portions of the first and second magnetic poles have a width defined in a direction oriented parallel to a plane extending over the circumference of said hard magnetic member which is smaller than a width of portions of the first and second magnetic poles around interfaces between ends of the first and second magnetic poles.

5. An angular position sensor as set forth in claim 2, wherein said hard magnetic member has sub-soft magnetic members which work to convert magnetic flux generated from the first and second magnetic poles into the magnetic flux that is substantially uniform in amount within the given angular range, the sub-soft magnetic members being disposed on outer peripheries of the central portions of the first and second magnetic poles.

6. An angular position sensor as set forth in claim 2, wherein widths of the first and second magnetic poles of said hard magnetic member in a direction perpendicular to the circumferential direction of said hard magnetic member decrease toward circumferential centers of the first and second magnetic poles.

7. An angular position sensor as set forth in claim 6, wherein each of said hard magnetic member and said soft magnetic member has a circular inner circumference, said hard magnetic member having substantially circular outer circumference defined by geometry that widths of the circumferential centers of the first and second magnetic poles in the direction perpendicular to the circumferential direction of said hard magnetic member are smaller than widths of interfaces between the first and second magnetic poles.

8. An angular position sensor as set forth in claim 1, wherein said hard magnetic member has a thickness in a direction perpendicular to the circumference thereof which is smaller than that of said soft magnetic member, and wherein said hard magnetic member and said soft magnetic member are so disposed that a plane defined on a circumferential center line of said hard magnetic member in a thickness-wise direction thereof coincides with a plane defined on a circumferential center line of said soft magnetic member in a thickness-wise direction thereof.

9. An angular position sensor as set forth in claim 1, further comprising a magnetic shield which surrounds said soft magnetic member.

10. An angular position sensor as set forth in claim 9, wherein said soft magnetic member has a circumference and is disposed outside the circumference of said hard magnetic member, said soft magnetic member having a first, a second, a third, and a fourth gap formed therein at an interval of approximately 90° in a circumferential direction of said soft magnetic member, and wherein a distance between an outer periphery of said soft magnetic member and said magnetic shield is greater than a length of each of the first to fourth gaps in the circumferential direction of said soft magnetic member.

11. An angular position sensor as set forth in claim 1, a thickness of said hard magnetic member in a direction perpendicular to a plane extending over the circumference of said hard magnetic member is greater than that of said soft magnetic member, ends of said hard magnetic member opposed in the direction perpendicular to the plane extending over the circumference of said hard magnetic member projecting outside ends of said soft magnetic member in the direction perpendicular to the plane extending over the circumference of said hard magnetic member.

12. An angular position determining apparatus comprising:
    an angular position sensor including (a) a hard magnetic member connected to a rotary member, said hard magnetic member having a circumference and magnetized in a circumferential direction thereof to produce a magnetic field therearound and working to produce magnetic flux that is substantially uniform in amount within a given angular range in a circumferential direction thereof, said hard magnetic member having a first magnetic pole and a second magnetic pole different in polarity from the first magnetic pole, the first and second magnetic poles being jointed at ends thereof at locations 180° apart from each other in a circumferential direction of said hard magnetic member, (b) a soft magnetic member disposed outside the circumference of said hard magnetic member within the magnetic field produced by said hard magnetic member to form a magnetic circuit, rotation of the rotary member to change a relative position between the magnetic field and said hard magnetic member causes a magnetic flux density in the magnetic circuit to change, said soft magnetic member having gaps formed therein at an interval of approximately 90°, and (c) a magnetic flux density measuring sensor including a first and a second sensor element respectively disposed in two of the gaps adjacent in the circumferential direction of said soft magnetic member, the first and second sensor elements working to measure magnetic flux densities within the two gaps and produce electric signals indicative thereof; and an angular position computing circuit working to computing an angular position of the rotary member based on the electric signals produced by said magnetic flux density measuring sensor.

13. An angular position determining apparatus as set forth in claim 12, wherein said angular position computing circuit is designed to combine the electric signals to determine the angular position of the rotary member.

14. An angular position determining apparatus as set forth in claim 12, wherein said angular position computing circuit performs at least one of addition, subtraction, multiplication, and division operations on the electric signals provided by said magnetic flux density measuring sensor.

15. An angular position determining apparatus as set forth in claim 12, wherein said rotary member is a steering shaft connected to a steering wheel of an automotive vehicle.

16. An angular position determining apparatus comprising:

a ring-shaped hard magnetic member connected to a rotary member, said hard magnetic member including a first magnetic pole and a second magnetic pole different in polarity from the first magnetic pole, the first and second magnetic poles being jointed at ends thereof at locations 180° apart from each other in a circumferential direction of said hard magnetic member, said hard magnetic member being so designed as to create magnetic flux that is substantially uniform in amount within a given angular range in a circumferential direction thereof;

a soft magnetic member disposed outside a circumference of said hard magnetic member having formed therein gaps arrayed at an interval of approximately 90°, rotation of the rotary member to change a relative position between said hard magnetic member and said soft magnetic member causes a magnetic flux density in the gaps to change;

magnetic flux density measuring sensors disposed one in each of two of the gaps adjacent in a direction of array of the gaps, said magnetic flux density measuring sensors working to magnetic flux densities within the two gaps and produce electric signals indicative thereof which exhibit substantially triangular waves shifted 90° apart in phase from each other and each of which has a straight portion; and an angular position computing circuit working to combine and correct the straight portions of said triangular waves to form a substantially single straight line, said angular position computing circuit computing an angular position of the rotary member using the straight line.

17. An angular position determining apparatus as set forth in claim 16, wherein the electric signals produced by said magnetic flux density measuring sensors are voltage signals whose level change as a function of the angular position of the rotary member, wherein correction of the straight portions of the triangular waves is achieved in said angular position computing circuit by extracting segments from the straight portions each of which extends over one of preselected angular ranges of rotation of the rotary member, bringing signs of inclinations of the segments into agreement with each other, moving the segments in parallel to bring a voltage level of an end of each of the segments into agreement with that of an end of an adjacent one of the segments, and joining the moved segments to produce a single voltage-to-angle line, defining a straight voltage-to-angle line extending between a maximum voltage level and a minimum voltage level indicated by the single voltage-to-angle line, determining a middle voltage level intermediate between the straight voltage-to-angle line, determining a voltage correction value required to bring the middle voltage level into agreement with an ideal one, and determining an inclination correction value required to bring an inclination of the straight voltage-to-angle line into agreement with an ideal one.

18. An angular position determining apparatus as set forth in claim 16, wherein each of said magnetic flux density measuring sensors works to correct the electric signal so as to compensate for an error arising from an ambient temperature.

19. An angular position determining apparatus as set forth in claim 18, wherein each of said magnetic flux density measuring sensors is equipped with a temperature-to-correction value map, each of said magnetic flux density measuring sensors working to pick up a correction value from the temperature-to-correction value map which corresponds to the ambient temperature and correct the electric signal using the correction value.

20. An angular position determining apparatus as set forth in claim 16, wherein said angular position computing circuit stores therein an ideal maximum voltage level and an ideal minimum voltage level of the electric signals, determines a first difference between an actual maximum voltage level of the electric signals and the ideal maximum voltage level and a second difference between an actual minimum voltage level and the ideal minimum voltage level, and corrects the actual maximum and minimum voltage levels using the first and second differences.

* * * * *